(12) United States Patent
Fujita et al.

(10) Patent No.: US 12,474,515 B2
(45) Date of Patent: Nov. 18, 2025

(54) OPTICAL STACK AND DISPLAY

(71) Applicant: 3M INNOVATIVE PROPERTIES COMPANY, St. Paul, MN (US)

(72) Inventors: Takashi Fujita, Kanagawa (JP); Hideaki Shirotori, Kanagawa (JP); Chikara Abe, Yamagata (JP); Matthew B. Johnson, Woodbury, MN (US); Brianna N. Wheeler, Bloomington, MN (US); Adam D. Haag, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 612 days.

(21) Appl. No.: 17/780,581

(22) PCT Filed: Dec. 8, 2020

(86) PCT No.: PCT/IB2020/061664
§ 371 (c)(1),
(2) Date: May 27, 2022

(87) PCT Pub. No.: WO2021/130580
PCT Pub. Date: Jul. 1, 2021

(65) Prior Publication Data
US 2023/0350119 A1    Nov. 2, 2023

Related U.S. Application Data

(60) Provisional application No. 62/952,609, filed on Dec. 23, 2019.

(51) Int. Cl.
*G02B 5/30* (2006.01)
(52) U.S. Cl.
CPC .................... *G02B 5/305* (2013.01)

(58) Field of Classification Search
None
See application file for complete search history.

(56) References Cited

U.S. PATENT DOCUMENTS

| | | | |
|---|---|---|---|
| 5,882,774 | A | 3/1999 | Jonza et al. |
| 6,096,375 | A | 8/2000 | Ouderkirk et al. |
| | | (Continued) | |

FOREIGN PATENT DOCUMENTS

| | | | | |
|---|---|---|---|---|
| JP | 2004212762 | A | * | 7/2004 |
| JP | 2008287055 | A | | 11/2008 |
| | (Continued) | | | |

OTHER PUBLICATIONS

International Search Report for PCT Application No. PCT/IB2020/061664, mailed on Mar. 9, 2021, 5 pages.

*Primary Examiner* — Ryan Crockett
(74) *Attorney, Agent, or Firm* — Clifton F. Richardson

(57) ABSTRACT

An optical stack includes a reflective polarizer including a plurality of interference layers and an absorbing polarizer disposed on the reflective polarizer. The plurality of interference layers transmits at least about 85% of an incident light having a first polarization state, reflects at least about 80% of the incident light having a second polarization state, and transmits less than about 0.1% of the incident light having the second polarization state. The absorbing polarizer has a first transmittance for the first polarization state and a second transmittance for the second polarization state. An average of the first and second transmittances is greater than about 0.46. The second transmittance has a first standard deviation. The optical stack has a transmittance for the second polarization state having a second standard deviation which is less than the first standard deviation by at least about 10%. A display includes the optical stack.

13 Claims, 21 Drawing Sheets

(56) References Cited

U.S. PATENT DOCUMENTS

| | | |
|---|---|---|
| 6,179,948 B1 | 1/2001 | Merrill et al. |
| 6,783,349 B2 | 8/2004 | Neavin et al. |
| 6,967,778 B1 | 11/2005 | Wheatley et al. |
| 9,162,406 B2 | 10/2015 | Neavin et al. |
| 9,891,362 B2 | 2/2018 | Weber et al. |
| 10,466,398 B2 | 11/2019 | Johnson et al. |
| 2016/0103260 A1 | 4/2016 | Nam et al. |
| 2020/0183065 A1* | 6/2020 | Haag ................. G02F 1/133615 |
| 2021/0116747 A1* | 4/2021 | Haag .................... G02B 5/1814 |
| 2022/0052301 A1* | 2/2022 | Xu ..................... H10K 59/8791 |
| 2022/0357493 A1* | 11/2022 | Haag .................... G02B 27/283 |

FOREIGN PATENT DOCUMENTS

| | | | | |
|---|---|---|---|---|
| JP | 2009031627 A | | 2/2009 | |
| JP | 2015036780 A | | 2/2015 | |
| JP | 2015055789 A | | 3/2015 | |
| JP | 06118231 B2 | | 4/2017 | |
| JP | 2018194606 A | * | 12/2018 | ............... G02B 5/30 |
| WO | 2018163009 A1 | | 9/2018 | |

\* cited by examiner

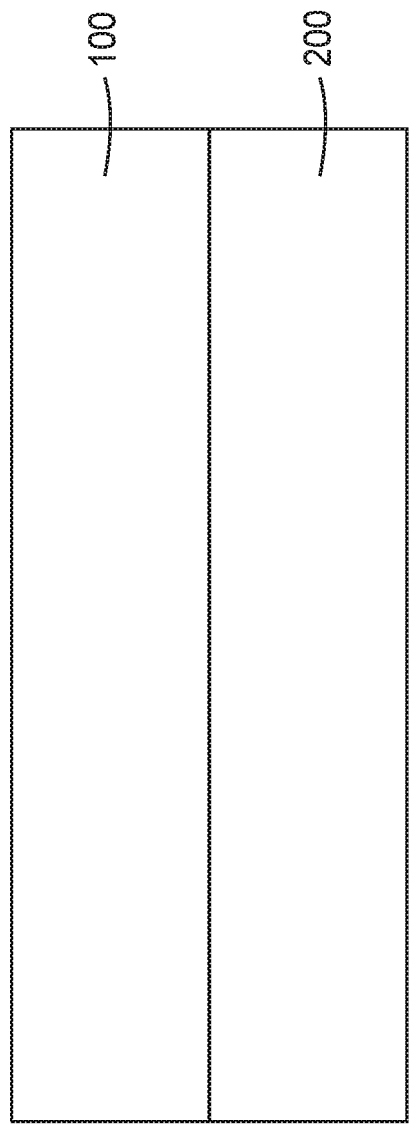
FIG. 1

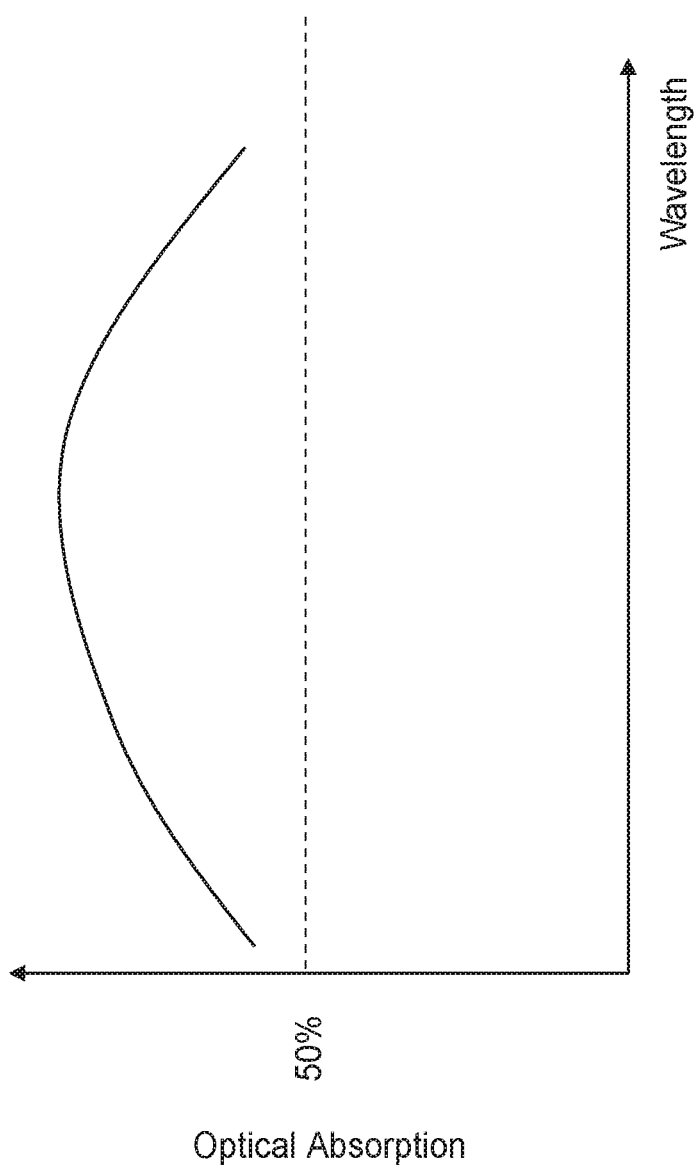

OPTICAL STACK AND DISPLAY

CROSS REFERENCE TO RELATED APPLICATIONS

This application is a national stage filing under 35 U.S.C. 371 of PCT/IB2020/061664, filed Dec. 8, 2020, which claims the benefit of Provisional Application No. 62/952,609, filed Dec. 23, 2019, the disclosures of which are incorporated by reference in their entirety herein.

BACKGROUND

A display can include a reflective polarizer and an absorbing polarizer.

SUMMARY

The present disclosure relates to optical stacks and displays. An optical stack can include a reflective polarizer and an absorbing polarizer disposed on the reflective polarizer. A display can include the optical stack. The reflective polarizer can be a high contrast reflective polarizer (e.g., having a transmittance of at least about 0.85 for a pass polarization state for at least one visible wavelength and a transmittance of less than about 0.001 for a block polarization state for at least one visible wavelength, and/or having a polarization efficiency greater than about 0.995 for at least one visible wavelength). The absorbing polarizer can have a high (compared to conventional absorbing polarizers) average transmittance (e.g., a transmittance for unpolarized light for at least one visible wavelength of greater than about 0.46) and/or a high (compared to conventional absorbing polarizers) standard deviation of block state transmittance and/or polarization efficiency (e.g., a standard deviation of block state transmittance can be greater than about 0.0035 and/or a standard deviation of polarization efficiency can be greater than about 0.005). It has been found, according to some embodiments, that optical defects due to the high standard deviation of block state transmittance and/or polarization efficiency can be substantially reduced or eliminated due to the presence of the reflective polarizer.

In some aspects, the present disclosure provides an optical stack including a reflective polarizer and an absorbing polarizer disposed on and substantially co-extensive with the reflective polarizer. The reflective polarizer includes a plurality of interference layers. The optical stack is such that for a substantially normally incident light and for at least a first wavelength between about 450 nm and about 670 nm: each interference layer reflects or transmits light primarily by optical interference; the plurality of interference layers transmits at least about 85% of the incident light having a first polarization state, reflects at least about 80% of the incident light having an orthogonal second polarization state, and transmits less than about 0.1% of the incident light having the second polarization state; the absorbing polarizer has a first optical transmittance for the first polarization state, an optical absorption greater than about 50% for the second polarization state, and a second optical transmittance for the second polarization state. An average of the first and second optical transmittances can be greater than about 0.46. The second optical transmittance has a first standard deviation across at least 80% of the absorbing polarizer. The optical stack has an optical transmittance for the second polarization state having a second standard deviation across at least 80% of the optical stack. The second standard deviation can be less than the first standard deviation by at least about 10%.

In some aspects, the present disclosure provides a display including a display panel having an active area configured to display an image; an extended light source configured to provide illumination to the display panel; a reflective polarizer disposed between the display panel and the extended light source; and an absorbing polarizer disposed between the display panel and the reflective polarizer. The reflective polarizer includes a plurality of polymeric layers numbering at least 50 in total where each polymeric layer has an average thickness less than about 500 nm. The extended light source, the active area of the display panel, the reflective polarizer, and the absorbing polarizer can be substantially co-extensive with each other. The display can be such that for a substantially normally incident light and for at least one wavelength between about 450 nm and about 650 nm: a polarization efficiency of the reflective polarizer across the active area of the display panel has an average greater than about 0.995 and a standard deviation less than about 0.001; and a polarization efficiency of the absorbing polarizer across the active area of the display panel has an average less than about 0.93 and a standard deviation greater than about 0.005.

These and other aspects will be apparent from the following detailed description. In no event, however, should this brief summary be construed to limit the claimable subject matter.

BRIEF DESCRIPTION OF THE DRAWINGS

FIG. 1 is a schematic cross-sectional view of an optical stack;

FIG. 9 is a schematic plot of optical absorption versus wavelength for an absorbing polarizer;

DETAILED DESCRIPTION

Figure 2:
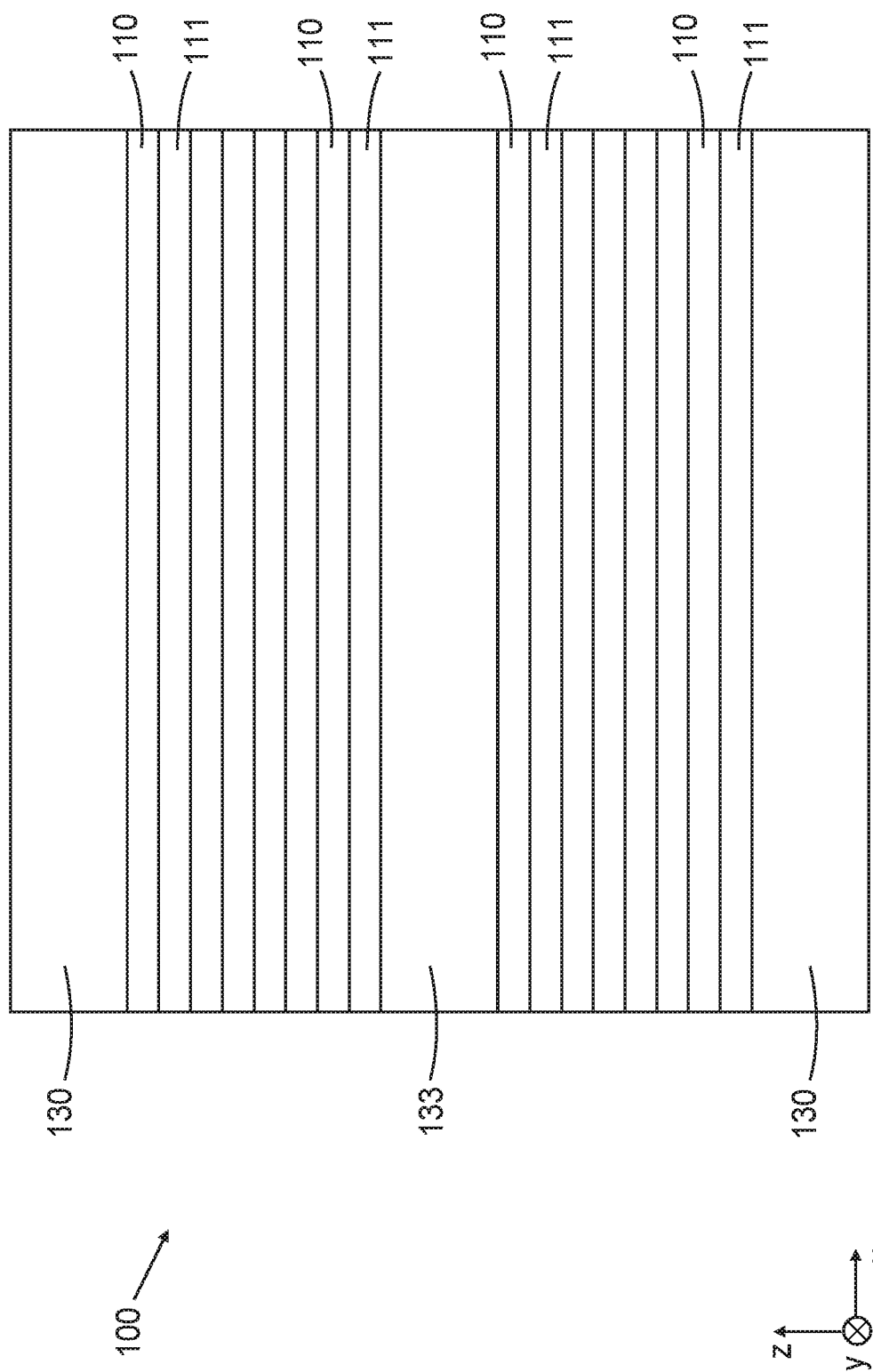
FIG. 2 is a schematic cross-sectional view of the reflective polarizer.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

An optical stack can include a reflective polarizer and an absorbing polarizer disposed on the reflective polarizer. In some embodiments, the absorbing polarizer is weaker (e.g., higher average transmittance and/or lower polarization efficiency) than conventional absorbing polarizers. A weaker absorbing polarizer can be made by reducing the thickness and/or the iodine concentration, for example, compared to a conventional iodine-stained polyvinyl alcohol absorbing polarizer. It has been found that weaker absorbing polarizers typically have a larger spatial variation in block state transmittance and/or a larger spatial variation in polarization efficiency than conventional absorbing polarizers. Such variation causes optical defects in many applications. However, it has been found, according to some embodiments, that when an optical stack or display includes the weak absorbing polarizer combined with a high contrast reflective polarizer (e.g., transmittance in the block state of less than about 0.1% and/or polarization efficiency greater than about 0.995) that the variations in the absorbing polarizer does not cause visible or noticeable optical defects. Further, it has been found that using the weak reflective polarizer can, in some embodiments, result in a higher overall transmission which can result in an improved efficiency in display systems, for example. In liquid crystal display (LCD) systems, for example, it has been found that the combination of the absorbing and reflective polarizers, according to some embodiments, results in a higher brightness without a significant drop in contrast ratio, or even with an increased contrast ratio, compared to conventional displays.

FIG. 1 is a schematic cross-sectional view of an optical stack 1000 including a reflective polarizer 100 and an absorbing polarizer 200 disposed on and substantially co-extensive with the reflective polarizer 100. The optical stack 1000 can optionally include additional layers. For example, in some embodiments, the optical stack includes one or more of a hard coat layer, a retarder layer (e.g., a quarter wave retarder), or a diffuser layer disposed on the reflective polarizer 100 opposite the absorbing polarizer 200.

The reflective polarizer 100 can be a multilayer optical film reflective polarizer. As is known in the art, multilayer optical films including alternating polymeric layers can be used to provide desired reflection and transmission bands by suitable selection of layer thickness. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. High contrast reflective polarizers (e.g., having a low block state transmittance and/or high polarization efficiency) can be made, for example, by using two packets of alternating polymeric layers, where the two packets provide reflection in substantially overlapping wavelength ranges. High contrast reflective polarizers are described in International Appl. No. WO2018/163009 (Haag et al.) and corresponding U.S. patent application Ser. No. 16/487,109 (Haag et al.).

An additional benefit of the reflective polarizer 100, according to some embodiments, is that the polarizer can provided improved environmental performance. For example, in some embodiments, the reflective polarizer 100 has a lower moisture vapor transmission rate (MVTR) than traditional reflective polarizers due to including more polymeric layers than traditional reflective polarizers. MVTR can be determined using a MOCON MVTR testing system (available from MOCON, Inc., Brooklyn Park, MN) at 23° C. In some embodiments, the reflective polarizer 100 has an MVTR of less than about 4 $g/m^2$-day or less than about 3 $g/m^2$-day (e.g., about 2 $g/m^2$-day). For comparison, the APF-V3 reflective polarizer (available from 3M Company, St. Paul, MN) has an MVTR measured under the same conditions of about 7 $g/m^2$-day, while an 80 micrometer thick cellulose triacetate film (TAC) film, which is a typical film used for barrier protection for the iodine-stained polyvinyl alcohol absorbing polarizers, has an MVTR of about 40 $g/m^2$-day.

In some embodiments, the absorbing polarizer 200 is bonded to the reflective polarizer 100. For example, an adhesive layer can be used to bond the absorbing polarizer 200 to the reflective polarizer 100. As another example, the absorbing polarizer 200 can be formed on the reflective polarizer 100 which can result in the absorbing polarizer 200 being bonded to the reflective polarizer 100. In some embodiments, the absorbing polarizer is coated on the reflective polarizer. For example, a polyvinyl alcohol solution can be coated onto a multilayer optical film prior to orienting the film, then the coated film can be substantially uniaxially oriented, and then the oriented polyvinyl alcohol can be stained with iodine and/or dye based solutions. Polarizers including a reflective polarizer and an absorbing polarizer coated on the reflective polarizer are described in U.S. Pat. No. 6,096,375 (Ouderkirk et al.). In some embodiments, the absorbing polarizer is weaker (e.g., higher average transmittance and/or lower polarization efficiency) than conventional absorbing polarizers. A relatively weak absorbing polarizer can be made by using a thinner polyvinyl alcohol layer and/or lower concentration of iodine or other staining solution, for example. In some embodiments, the absorbing polarizer is an iodine-stained polyvinyl alcohol (PVOH) polarizer.

FIG. 2 is a schematic cross-sectional view of the reflective polarizer 100 according to some embodiments. The reflective polarizer 100 includes a plurality of interference layers 110, 111. The interference layers 110, 111 can be a plurality of polymeric layers numbering at least 50 in total. Each layer 110, 111 can have an average thickness (mean thickness over the layer) less than about 500 nm, or less than about 400 nm, for example. The interference layers 110, 111 can reflect or transmit light primarily by optical interference. Interference layers may be described as reflecting or transmitting light primarily by optical interference when the reflectance and transmittance of the interference layers can be reasonably described by optical interference or reasonably accurately modeled as resulting from optical interference. The reflective polarizer 100 can optionally include additional layers 130, 133 which can be optically thick (e.g., an average thickness greater than about 1 micrometer, or greater than about 2 micrometers). The additional layers 130, 133 can include outermost skin layers 130 and/or protective boundary layer(s) 133 between adjacent packets of interference layers 110, 111. The plurality of interference layers can include alternating first (110) and second (111) polymeric interference layers.

The optical stack 1000 can be used in a display. For example, in some embodiments, a display includes a display panel, an extended light source (e.g., a lightguide with suitable light extractors and with suitable light sources to provide light to the lightguide) configured to provide illumination to the display panel, and the optical stack 1000 disposed between the display panel and the extended light source with the absorbing polarizer 200 facing the display panel and the reflective polarizer facing the extended light source.

Figure 3:
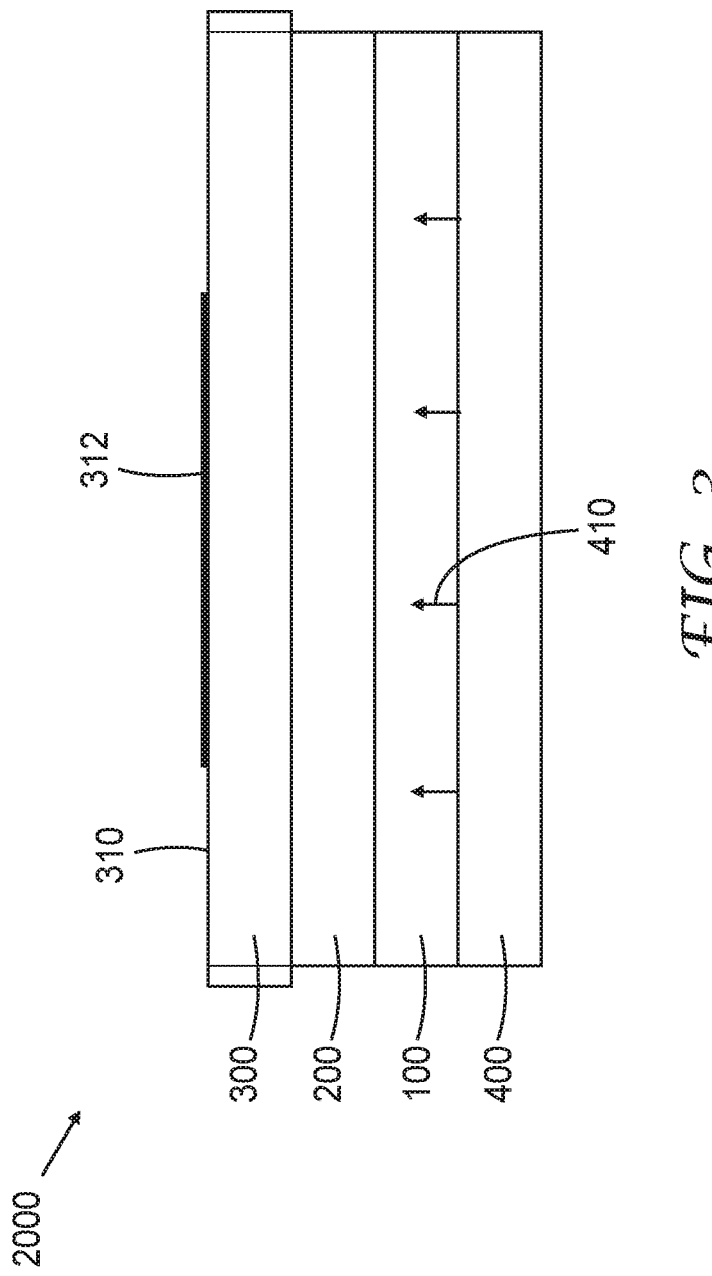
FIG. 3 is a schematic cross-sectional view of a display.

FIG. 3 is a schematic cross-sectional view of a display 2000 including a display panel 300 including an active area 310 configured to display an image 312; an extended light source 400 configured to provide illumination 410 to the display panel 300; a reflective polarizer 100 disposed between the display panel 300 and the extended light source 400; and an absorbing polarizer 200 disposed between the display panel 300 and the reflective polarizer 100. As described further elsewhere, the reflective polarizer 100 can include a plurality of polymeric layers numbering at least 50 in total where each polymeric layer has an average thickness less than about 500 nm. The absorbing polarizer 200 can be disposed on the reflective polarizer 100 to form an optical stack 1000 as described further elsewhere herein. The display 2000 can optionally include additional layer(s). For example, prism film(s) and/or diffuser(s) can be disposed between the reflective polarizer 100 and the extended light source 400. Alternatively, in some embodiments, prism film(s) and/or diffuser(s) can be portions of the extended light source 400. For example, the extended light source 400 can include a lightguide and prism(s) and/or diffuser(s) disposed on the lightguide.

In some embodiments, the extended light source 400, the active area 310 of the display panel 300, the reflective polarizer 100, and the absorbing polarizer 200 are substantially co-extensive with each other. Layers or elements can be described as substantially co-extensive with each other if at least about 60% of each layer or element is co-extensive with at least about 60% of each other layer or element. In some embodiments, for layers or elements described as substantially co-extensive with each other, at least about 80% or at least about 90% of each layer or element is co-extensive with at least about 80% or at least about 90% of each other layer or element.

The transmission, reflection, and/or absorption properties of the reflective polarizer 100, the absorbing polarizer 200, and/or the optical stack 1000 can be described for substantially normally incident light, or for light at one or more angles of incidence, and for one or more wavelengths in a wavelength range, or values cane be averaged over a wavelength range. In the case of the optical stack 1000, transmission and reflection can be measured for light incident on the reflective polarizer 100.

Figure 4:
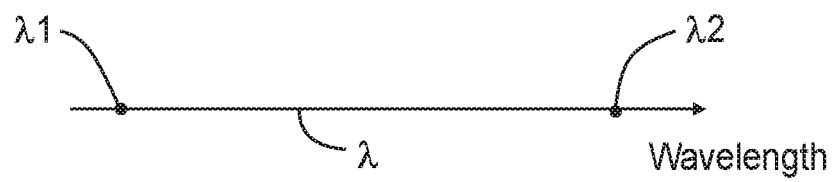
FIG. 4 is a schematic illustration of a wavelength in a wavelength range.

FIG. 4 is a schematic illustration of a wavelength λ in a wavelength range from λ1 to λ2. λ1 can be about 400 nm, or about 430 nm, or about 450 nm, for example λ2 can be about 650 nm or about 670 nm, or about 700 nm, for example. The wavelength λ can be about 500 nm, about 550 nm, or about 600 nm, or about 650 nm, for example.

Figure 5:
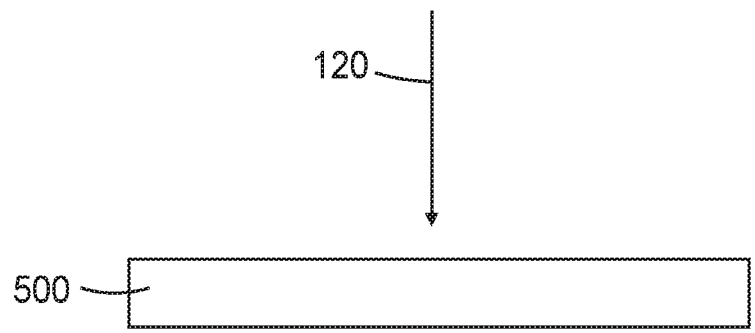
FIG. 5 is a schematic illustration of light substantially normally incident on an element or layer.

FIG. 5 is a schematic illustration of a light 120 substantially normally incident (e.g., within 30 degrees, or within 20 degrees, or within 10 degrees, or within 5 degrees of normally incident) on an element or layer 500. The element or layer 500 can be a reflective polarizer, an absorbing polarizer, or an optical stack, for example. The light 120 can have a first polarization state (e.g., polarized along the x-axis, referring to the x-y-z coordinate system of FIGS. 1-2) or an orthogonal second polarization state (e.g., polarized along y-axis), or the light 120 can be unpolarized. The first polarization state can be a pass polarization state and the second polarization state can be a block polarization state.

The block axis of the reflective polarizer 100 and the absorbing polarizer 200 can be substantially aligned (e.g., within 10 degrees, or 5 degrees or 3 degrees of parallel). For example, the block axes of the reflective polarizer 100 and the absorbing polarizer 200 can each be substantially parallel to the y-axis.

Figure 6A:
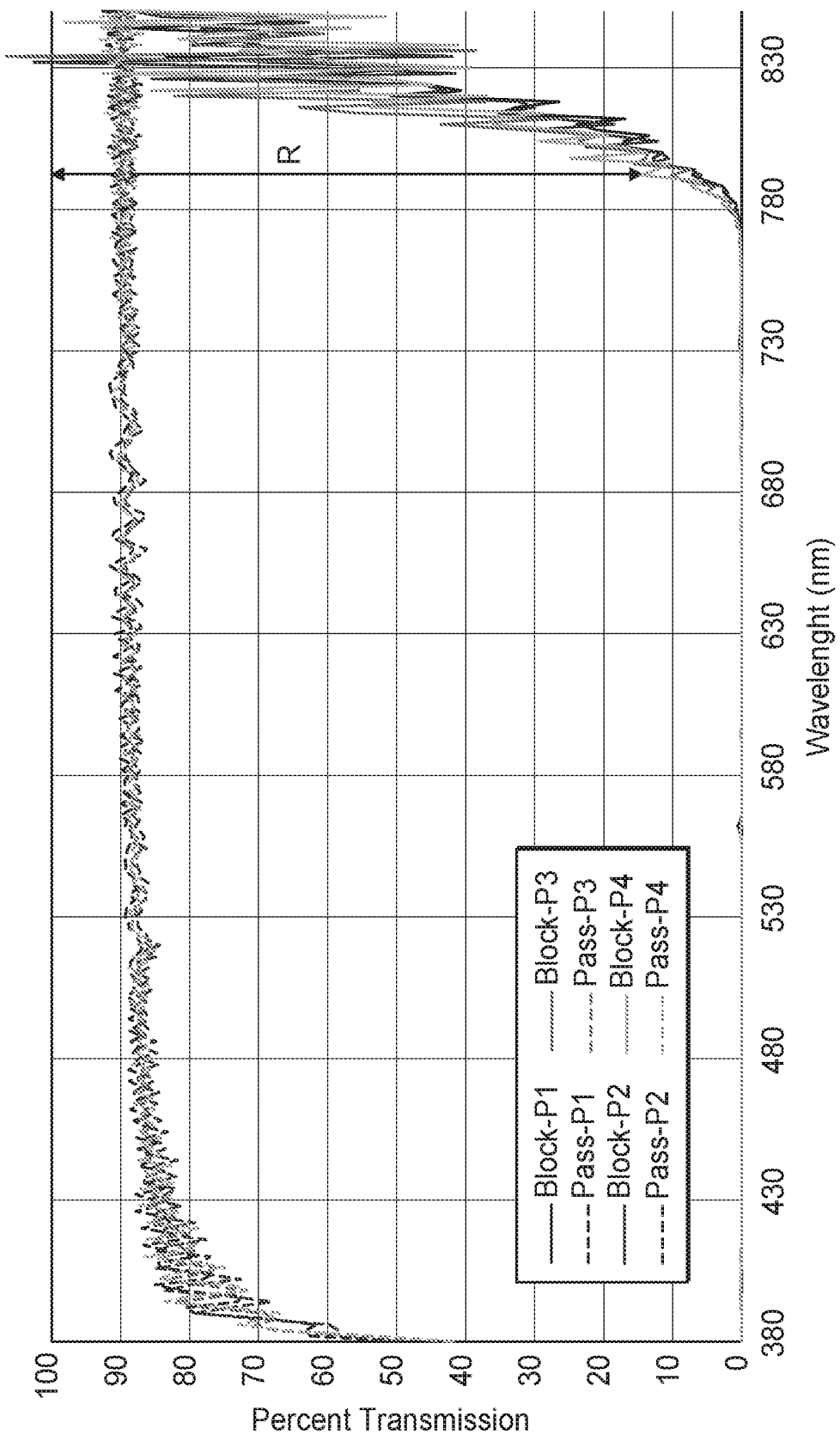
FIG. 6A is a plot of optical transmission versus wavelength for a reflective polarizer.
Figure 6B:
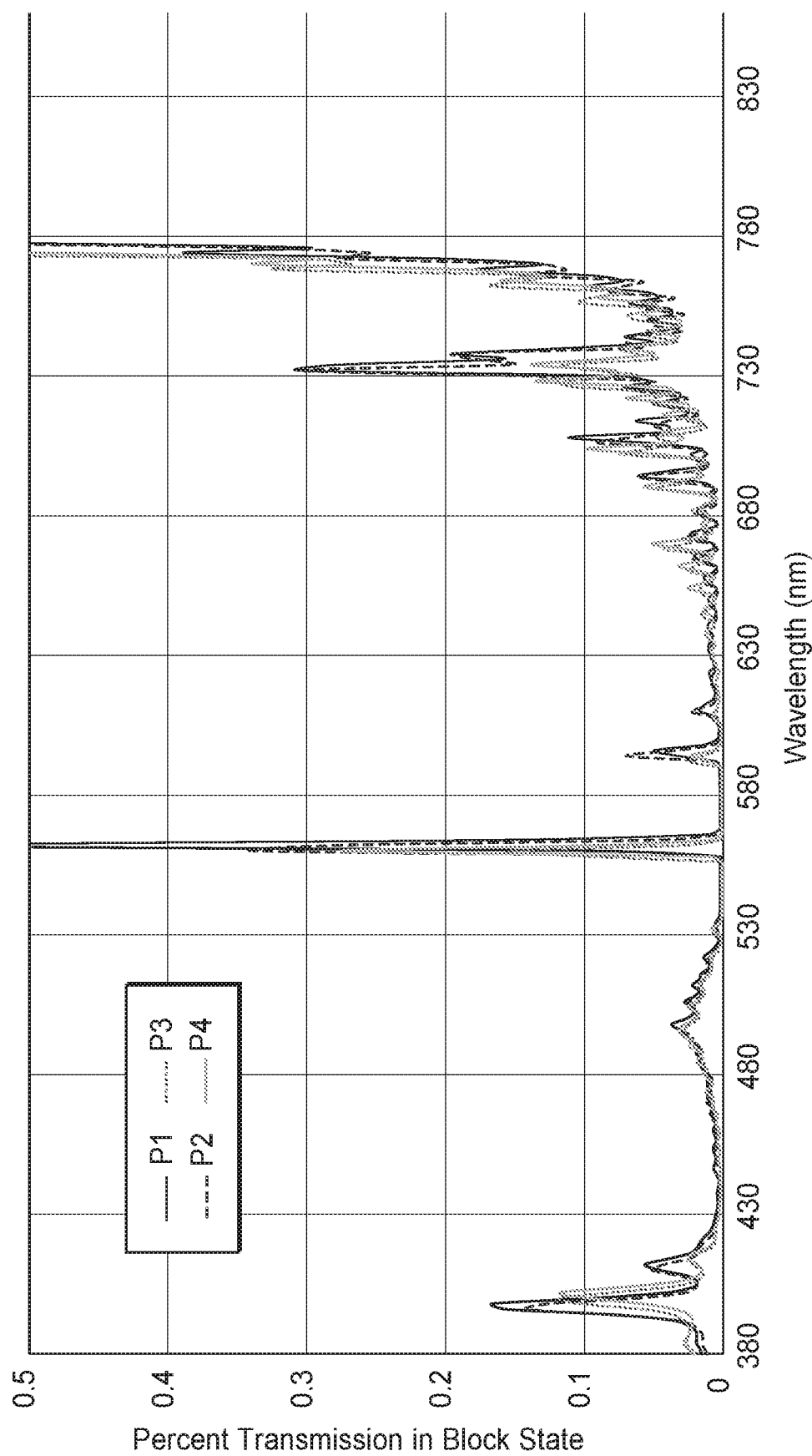
FIGS. 6B-6C are enlarged portions of the plot of FIG. 6A.
Figure 6C:
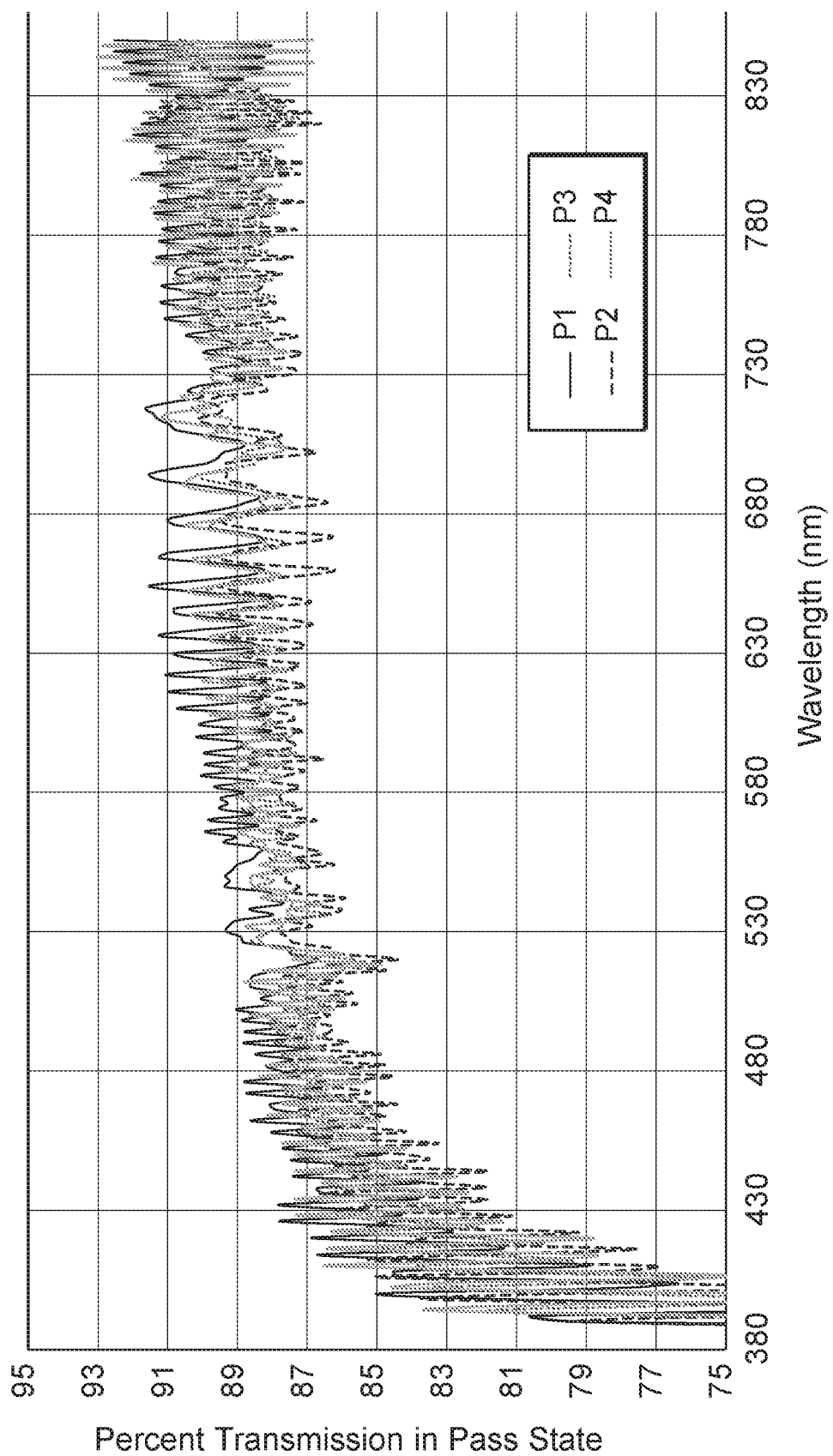

FIG. 6A is a plot of optical transmission (optical transmittance times 100%) versus wavelength for a reflective polarizer 100, according to some embodiments, for substantially normally incident light in a first polarization state (pass state) and in a second polarization state (block state). The transmission is shown for 4 spaced apart points (denoted P1-P4). In some embodiments, the optical absorption of the reflective polarizer is negligible so that the optical reflection R (optical reflectance times 100%) is about 100% minus the optical transmission. FIG. 6B is an enlarged portion of the plot of FIG. 6A showing the optical transmission for substantially normally incident light in the second polarization state (block state). FIG. 6C is an enlarged portion of the plot of FIG. 6A showing the optical transmission for substantially normally incident light in the first polarization state (pass state).

Figure 6D:
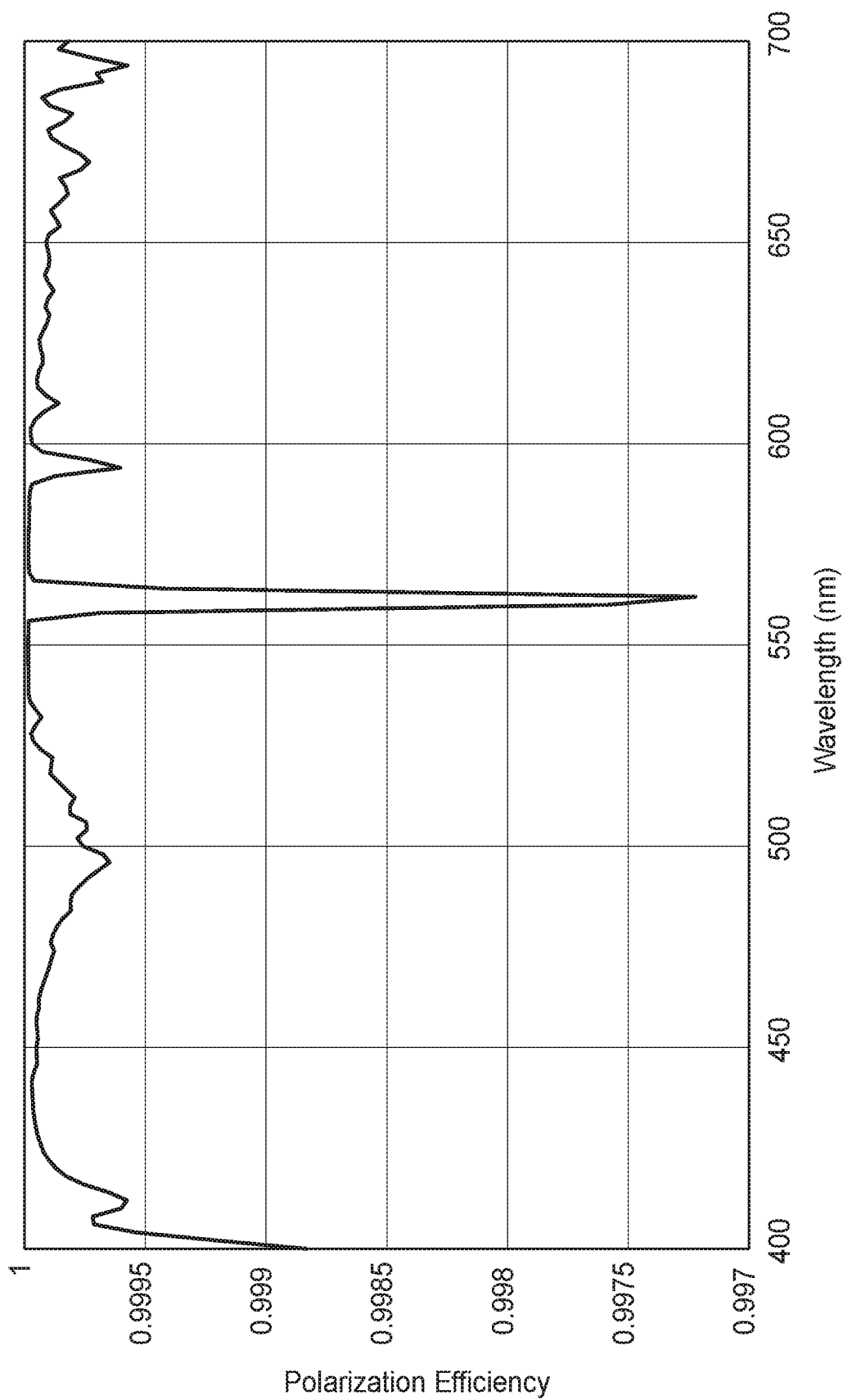
FIG. 6D is a plot of average of polarization efficiency versus wavelength for a reflective polarizer.
Figure 6E:
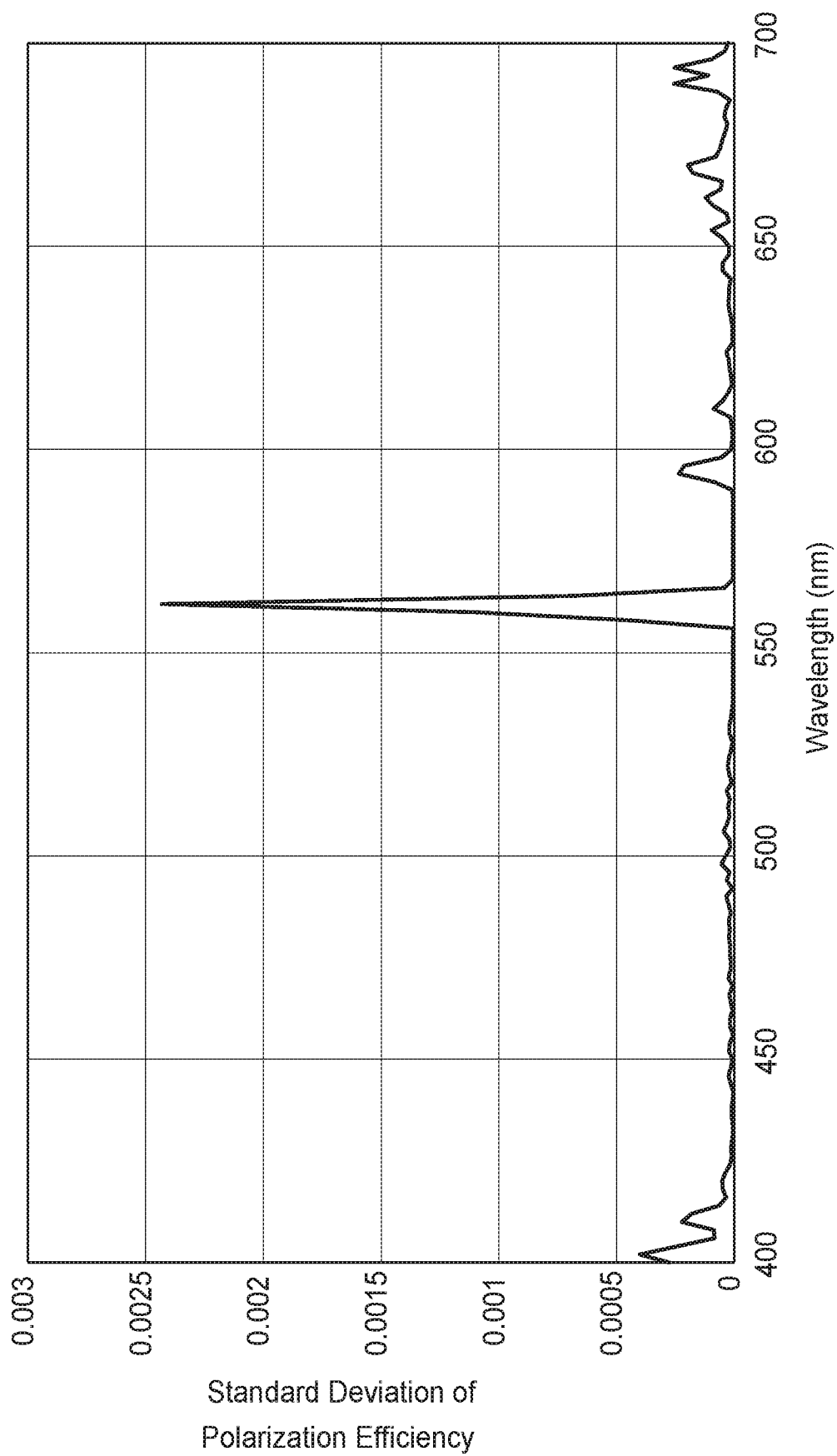
FIG. 6E is a plot of a standard deviation of polarization efficiency versus wavelength for a reflective polarizer.
Figure 6F:
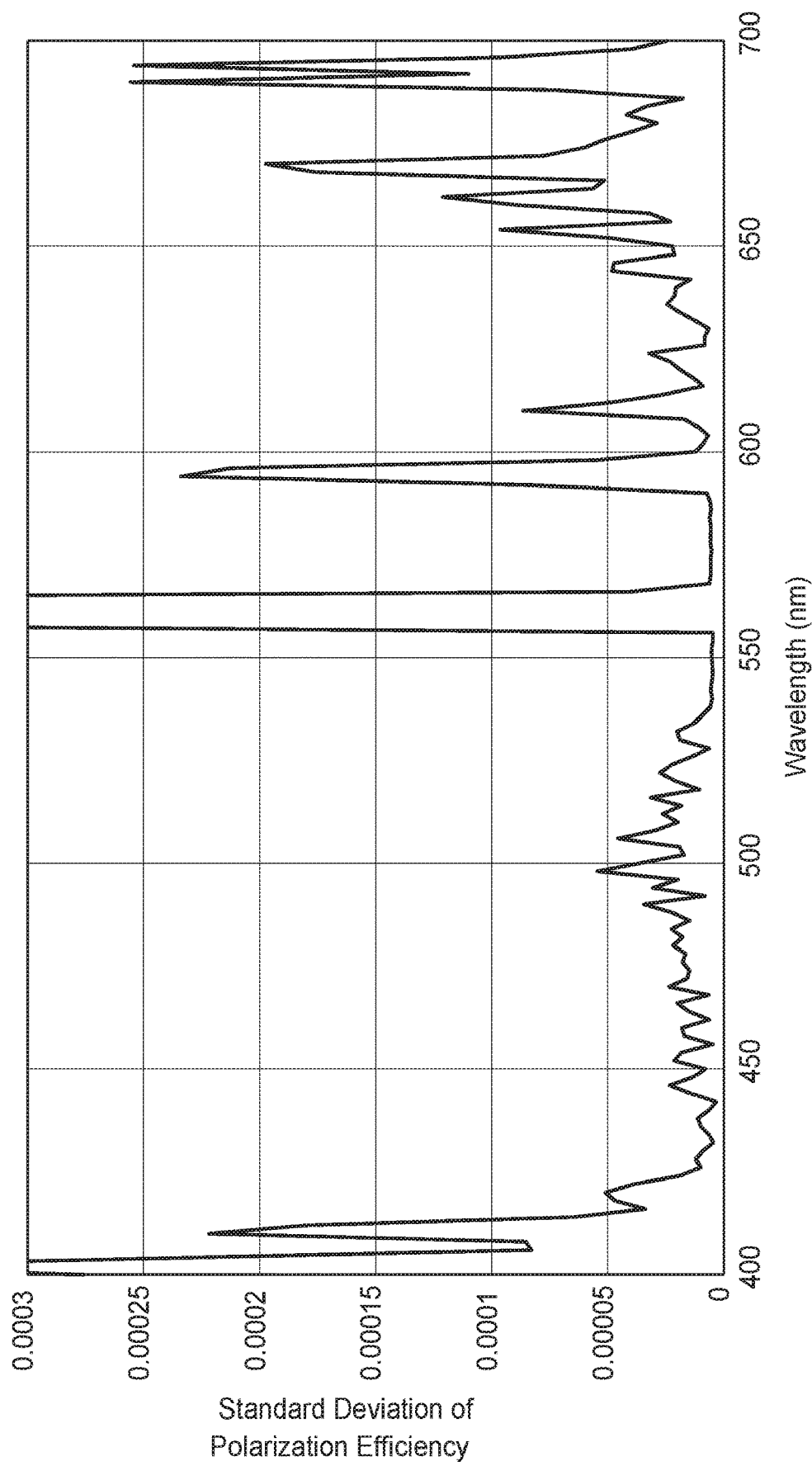
FIG. 6F is an enlarged portion of the plot of FIG. 6E.

FIG. 6D is a plot of an average polarization efficiency versus wavelength for a reflective polarizer 100, according to some embodiments. Polarization efficiency can be express in terms of the pass state optical transmittance Tp for substantially normally incident light 120 and the block state optical transmittance Tb for substantially normally incident light 120 as the square root of $(Tp-Tb)/(Tp+Tb)$. FIG. 6E is a plot of a standard deviation of polarization efficiency versus wavelength for a reflective polarizer 100, according to some embodiments. FIG. 6F is an enlarged portion of the plot of FIG. 6E.

The standard deviation of a polarization efficiency or a block state transmittance, for example, refers to the standard deviation of a distribution over an area (e.g., at least 80% of an area of a polarizer or an area of a polarizer co-extensive with an active area of a display panel), for example). The average (mean) and the standard deviation can be determined using measurements at 4, or at least 4, or at least 10, or at least 20 spaced apart points (e.g., 4 to 30 points), for example. The points can be spaced apart by 0.5 to 10 cm, for example, where larger spacing can be used for larger samples, for example. The average and the standard deviation can be determined at a wavelength (e.g., about 500 nm, or about 550 nm) or for an average over a wavelength range (e.g., about 450 nm to about 650 nm).

The plots shown in FIGS. 6A-6F were determined from transmission measurements made at 4 spaced apart locations on a reflective polarizer that was made as generally described in Example 1 of International Appl. No. WO2018/163009 (Haag et al.). Transmission measurements for optical stacks, reflective polarizers and absorptive polarizers were made on a LAMBDA 1050 UV/Vis/NIR Spectrophotometer (available from PerkinElmer, Inc., Waltham, MA).

In optical stack measurements, the reflective polarizer faced the light source and the absorbing polarizer faced the detector. The reflective polarizer 100 may correspond to this reflective polarizer, or to other reflective polarizers described in International Appl. No. WO2018/163009 (Haag et al.), or to still other reflective polarizers having optical properties described elsewhere herein.

Figure 10A:
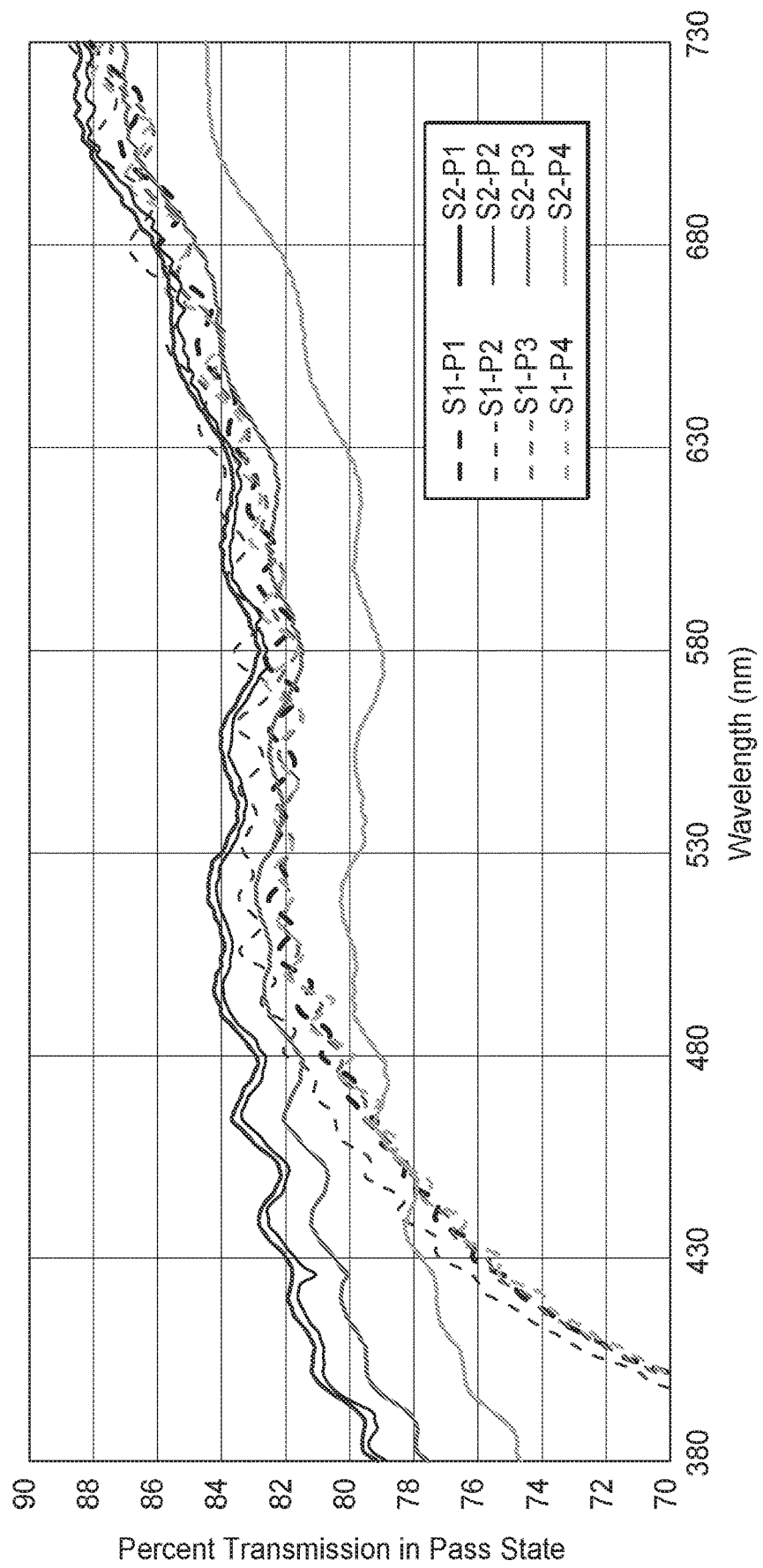
FIGS. 10A-10B are a plots of optical transmission versus wavelength for absorbing polarizers for first and second polarization states, respectively.
Figure 10B:
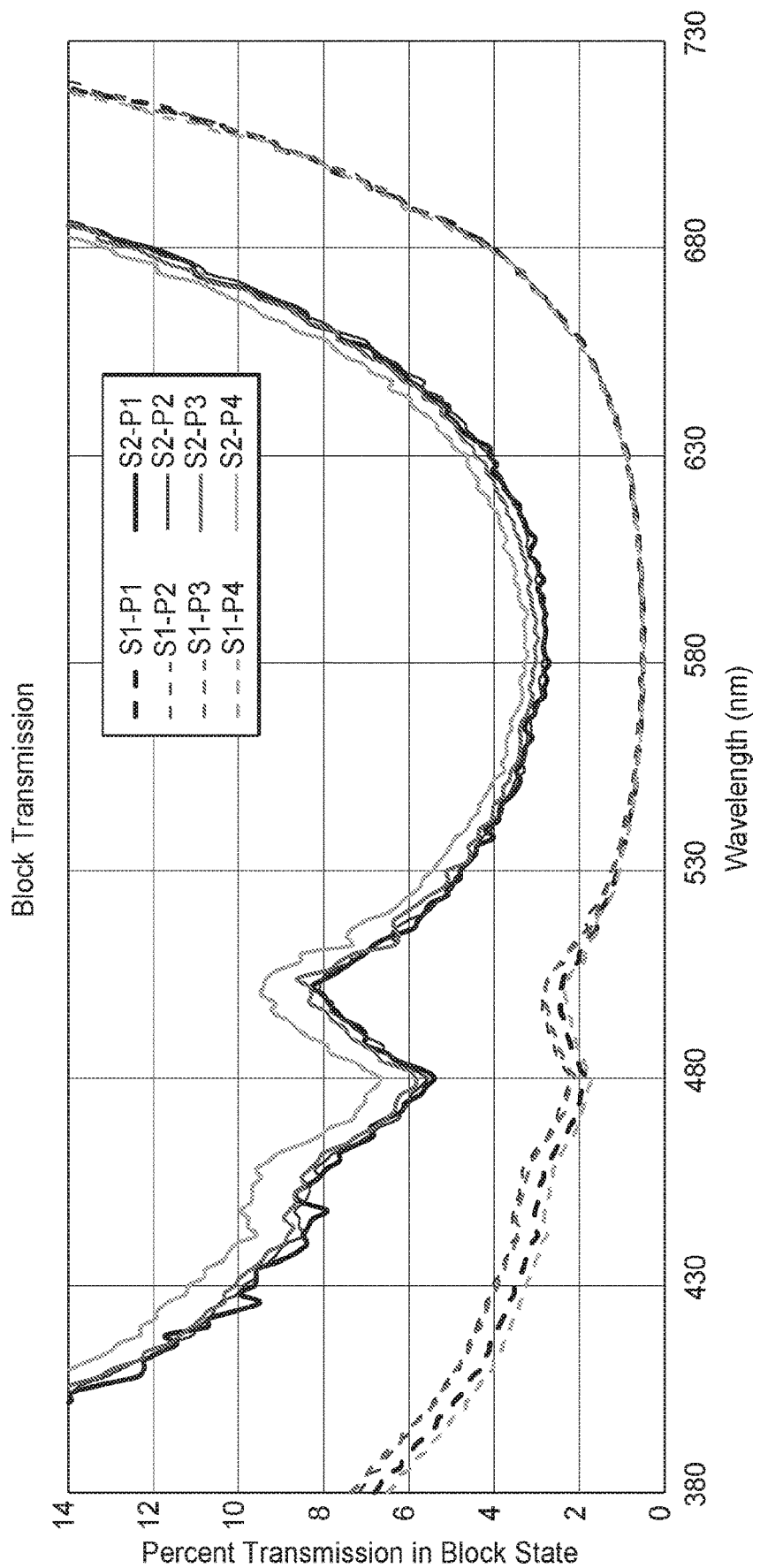

In some embodiments, the optical stack 1000 is such that for a substantially normally incident light 120 and for at least a first wavelength (e.g., $\lambda$): each interference layer 110, 111 reflects or transmits light primarily by optical interference; the plurality of interference layers 110, 111 transmits (see, e.g., FIG. 6A) at least about 85% of the incident light having a first polarization state (e.g., x-axis), reflects (see, e.g., FIG. 6A) at least about 80% of the incident light having an orthogonal second polarization state (e.g., y-axis), and transmits (see, e.g., FIG. 6B) less than about 0.1% of the incident light having the second polarization state; and the absorbing polarizer 200 has a first optical transmittance for the first polarization state (see, e.g., FIG. 10A), an optical absorption greater than about 50% for the second polarization state (see, e.g., FIG. 9), and a second optical transmittance for the second polarization state (see, e.g., FIG. 10B). In some embodiments, the plurality of interference layers 110, 111 transmits (see, e.g., FIG. 6B) less than about 0.05% of the incident light having the second polarization state. The at least the first wavelength can be between the wavelengths $\lambda 1$ and $\lambda 2$ described elsewhere herein. For example, the at least the first wavelength can be between about 450 nm and about 670 nm or between about between about 450 nm and about 650 nm. In some embodiments, the first wavelength is about 550 nm, for example.

The average of the first and second optical transmittances (see, e.g., FIG. 10C) can be greater than about 0.46, or greater than about 0.465, or greater than about 0.47, or greater than about 0.475, or greater than about 0.48. In the context of the average of the first and second optical transmittances, about 0.46, for example, can be 0.455, or 0.46, or 0.465, or any value from 0.455 to 0.465, for example. As another example, an average of about 0.465 can be 0.46, or 0.465, or 0.47, or any value from 0.46 to 0.47, for example. As yet another example, an average of about 0.47 can be 0.464, or 0.47, or 0.476, or any value from 0.464 to 0.476, for example. In some embodiments, the average of the first and second optical transmittances is greater than 0.455.

Figure 7:
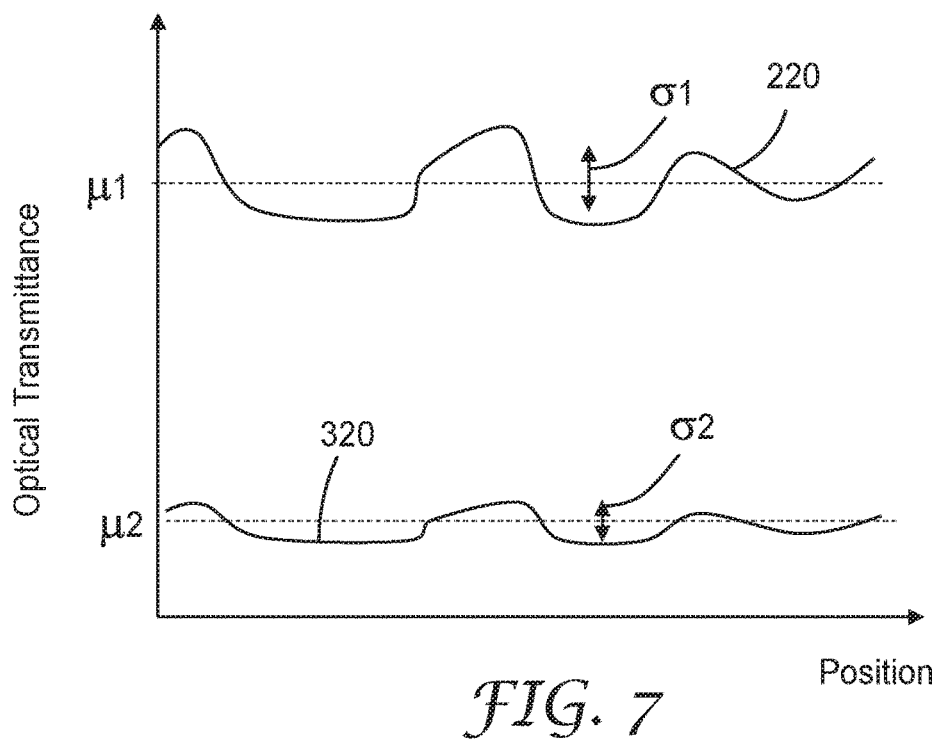
FIG. 7 is a schematic illustration of optical transmittances of an absorbing polarizer and an optical stack.

FIG. 7 is a schematic illustration of a spatial variation of the optical transmittance 220 of absorbing polarizer 200 according to some embodiments, and of a spatial variation of the optical transmittance 320 of optical stack 1000 according to some embodiments. The optical transmittance 220 and 320 can be for the first polarization state (pass state), for the second polarization state (block state), or for unpolarized light. The optical transmittance 220 has an average (mean over position) of $\mu 1$ and a standard deviation of $\sigma 1$. The optical transmittance 320 has an average (mean) of $\mu 2$ and a standard deviation of $\sigma 2$. The average and standard deviation are determined for various positions (e.g., across at least 80% of the polarizer or optical stack) and can be determined for a wavelength (e.g., $\lambda$) or for an average over wavelengths in a wavelength range (e.g., from $\lambda 1$ to $\lambda 2$). In some embodiments, $\mu 1 > \mu 2$ and $\sigma 1 > \sigma 2$.

In some embodiments, the second optical transmittance (e.g., 220) has a first standard deviation (e.g., $\sigma 1$) across at least 80% of the absorbing polarizer 200; and the optical stack has an optical transmittance (e.g., 320) for the second polarization state having a second standard deviation (e.g., $\sigma 2$) across at least 80% of the optical stack, where the second standard deviation is less than the first standard deviation by at least about 10%. In some embodiments, the first standard deviation (e.g., $\sigma 1$) is greater than about 0.0033, or greater than about 0.0035, or greater than about 0.04, or greater than about 0.0045, or greater than about 0.005, for example. In some such embodiments or in other embodiments, the second standard deviation (e.g., $\sigma 2$) is less than about 0.0001, or less than about 0.00002, or less than about 0.00001, for example. In some embodiments, the first standard deviation divided by the second standard deviation is at least about 2, or at least about 10, or at least about 100, or at least about 200, or at least about 300, or at least about 400.

In some embodiments, for a substantially normally incident unpolarized light (e.g., 120) and for a first wavelength range of about 450 nm to about 650 nm: the absorbing polarizer 200 has an optical transmittance averaged over the first wavelength range having a third standard deviation (e.g., $\sigma 1$) across at least 80% of the absorbing polarizer 200; and the optical stack has an optical transmittance averaged over the first wavelength range having a fourth standard deviation (e.g., $\sigma 2$) across at least 80% of the optical stack. The fourth standard deviation can be less than the third standard deviation by at least about 10%. In some embodiments, the third standard deviation is greater than about 0.005, or greater than about 0.006, or greater than about 0.65. In some such embodiments or in other embodiments, the fourth standard deviation is less than about 0.0055, or less than about 0.005, or less than about 0.0045.

Figure 8:
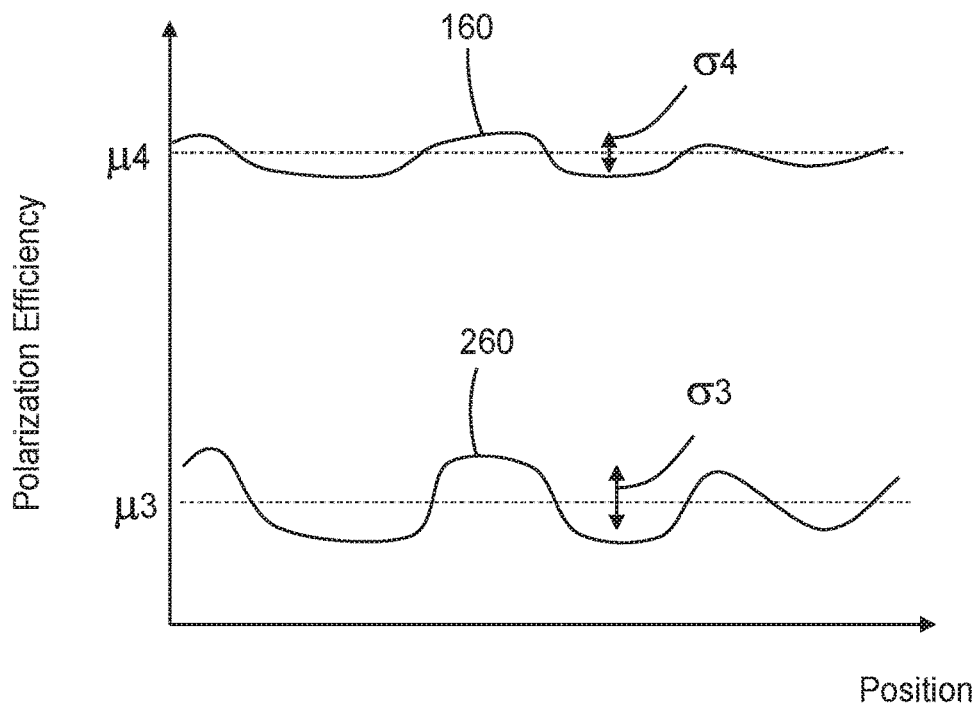
FIG. 8 is a schematic illustration of the polarization efficiencies of an absorbing polarizer and a reflective polarizer.

FIG. 8 is a schematic illustration of a spatial variation of the polarization efficiency 260 of absorbing polarizer 200 according to some embodiments, and of a spatial variation of the polarization efficiency 160 of reflective polarizer 100 according to some embodiments. The polarization efficiency 260 has an average (mean over position) of $\mu 3$ and a standard deviation of $\sigma 3$. The polarization efficiency 160 has an average (mean) of $\mu 4$ and a standard deviation of $\sigma 4$. The average and standard deviation are determined for various positions (e.g., across at least 80% of the polarizer) and can be determined for a wavelength (e.g., $\lambda$) or for an average over wavelengths in a wavelength range (e.g., from $\lambda 1$ to $\mu 2$). In some embodiments, $\mu 4 > \mu 3$ and $\sigma 4 < \sigma 3$.

In some embodiments, the display 2000 is such that for a substantially normally incident light 120 and for at least one wavelength (e.g., $\lambda$): a polarization efficiency of the reflective polarizer 100 across the active area 310 of the display panel 300 has an average (e.g., $\mu 4$) greater than about 0.995 and a standard deviation (e.g., $\sigma 4$) less than about 0.001; and a polarization efficiency of the absorbing polarizer 200 across the active area 310 of the display panel 300 has an average (e.g., $\mu 3$) less than about 0.93 and a standard deviation (e.g., $\sigma 3$) greater than about 0.005. In the context of a polarization efficiency, a value of about 0.93, for example, can be 0.92, or 0.93, or 0.94, or any value from 0.92 to 0.94, for example. As another example, a polarization efficiency of about 0.999 can be 0.9988, or 0.999, or 0.9992, any value from 0.9988 to 0.9992, for example. As still another example, a polarization efficiency of about 0.995 can be 0.994, or 0.995, or 0.996 any value from 0.994 to 0.996, for example. In some embodiments, the standard deviation of the polarization efficiency of the reflective polarizer 100 is less than about 0.0005, or less than about 0.0001, or less than about 0.00005. In some embodiments, the standard deviation of the polarization efficiency of the absorbing polarizer 200 is greater than about 0.0055, or greater than about 0.006, or greater than about 0.0065, or greater than about 0.007. In some embodiments, the average of the polarization efficiency of the absorbing polarizer 200 is less than about 0.92, or less than about 0.91. In some embodiments, the average of the polarization efficiency of the reflective polarizer 100 is greater than about 0.999, or greater than about 0.9995, or greater than about 0.9998, or greater than about 0.9999.

The at least one wavelength can be between λ1 and λ2 described elsewhere herein. For example, the at least one wavelength can be between about 450 nm and about 650 nm.

In some embodiments, for a substantially normally incident light 120 and for a wavelength range of about 450 nm to about 650 nm, the absorbing polarizer 200 has a polarization efficiency across the active area 310 of the display panel 300 averaged over the wavelength range (the polarization efficiency is averaged over wavelengths in the wavelength range and varies with position on the absorbing polarizer) having an average (e.g., μ3) less than about 0.945 and a standard deviation (e.g., σ3) greater than about 0.0045.

FIG. 9 is a schematic plot of optical absorption versus wavelength for an absorbing polarizer 200 according to some embodiments. In some embodiments, for a substantially normally incident light 120 and for at least a first wavelength (e.g., λ) between about 450 nm and about 670, or between about 450 nm and about 650 nm, the absorbing polarizer 200 has an optical absorption greater than about 50% for the second polarization state. In some embodiments, the optical absorption of the absorbing polarizer is greater than about 60%, or greater than about 70%, or greater than about 80% for the second polarization state.

FIGS. 10A-10B are a plots of optical transmission versus wavelength for absorbing polarizers for substantially normally incident light 120 in a first polarization state (pass state) and in a second polarization state (block state), respectively. The plots are for a first absorbing polarizer (sample "S1") and for a second absorbing polarizer (sample "S2"). Curves measured at 4 spaced apart locations for each polarizer are shown. The first absorbing polarizer "S1" was made by orienting a polyvinyl alcohol (PVOH) layer (KURARAY POVAL 28-99 available from KURARAY Co., Ltd., Tokyo, JP was used for the polyvinyl alcohol) and staining with iodine. The thickness of the PVOH layer and the iodine concentration was selected to produce the transmission shown in FIGS. 10A-10B. The second absorbing polarizer "S2" was made similarly but used a PVOH layer with a thickness of about 50% of that of first absorbing polarizer "S1". The first absorbing polarizer is significantly weaker than conventional reflective polarizers and the second absorbing polarizer is weaker still. For example, for substantially normally incident light in a wavelength range of about 450 nm to about 650 nm, a conventional SANRITZ absorbing polarizer has an average block state transmission of about 0.007%; the first absorbing polarizer has an average block state transmission of about 1.4%, and the second absorbing polarizer has an average block state transmission of about 5.2%.

In some embodiments, for a substantially normally incident light 120 and for at least a first wavelength (e.g., λ) between about 450 nm and about 670, or between about 450 nm and about 650 nm, the absorbing polarizer 200 has an optical transmission greater than about 4% for the second polarization state. In some embodiments, the average optical transmission of the absorbing polarizer (e.g., averaged over an area across at least 80% of the absorbing polarizer) is greater than about 5%, or greater than about 6%, or greater than about 7% for the second polarization state. For example, in the embodiment ("S2") of FIG. 10B, the average optical transmission is about 8.5% for the second polarization state at a wavelength of about 500 nm.

Figure 10C:
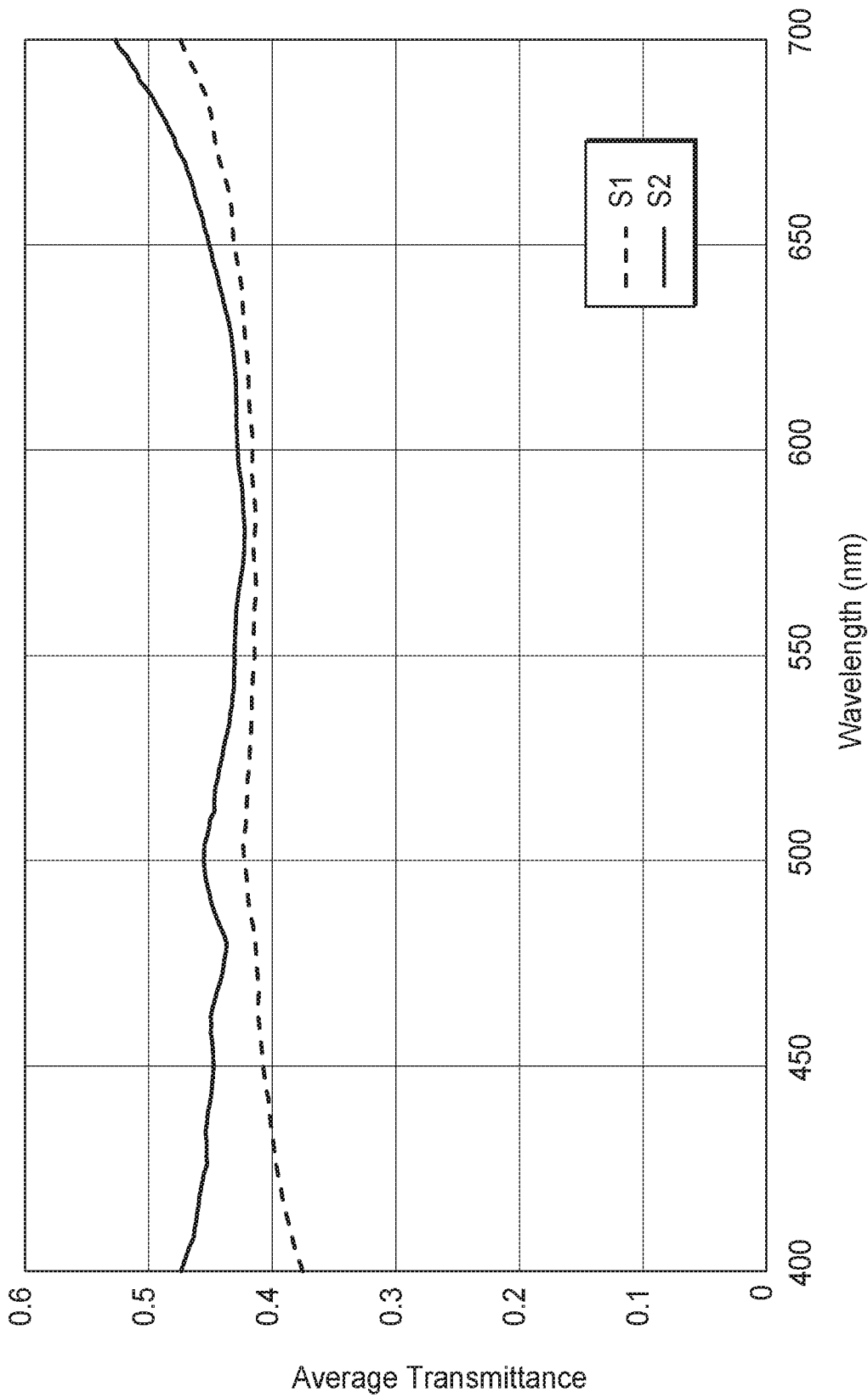
FIG. 10C is a plot of average of first and second optical transmittances for respective first and second polarization states for absorbing polarizers.

FIG. 10C is a plot of an average of first and second optical transmittances for respective first and second polarization states for absorbing polarizers. The curves of FIG. 10C were obtained from the curves of FIGS. 10A-10B by averaging over transmittance determined at the 4 points. For the second absorbing polarizer "S2", the average is 0.4554 at 500 nm and 0.4707 at 670 nm, for example.

Figure 10D:
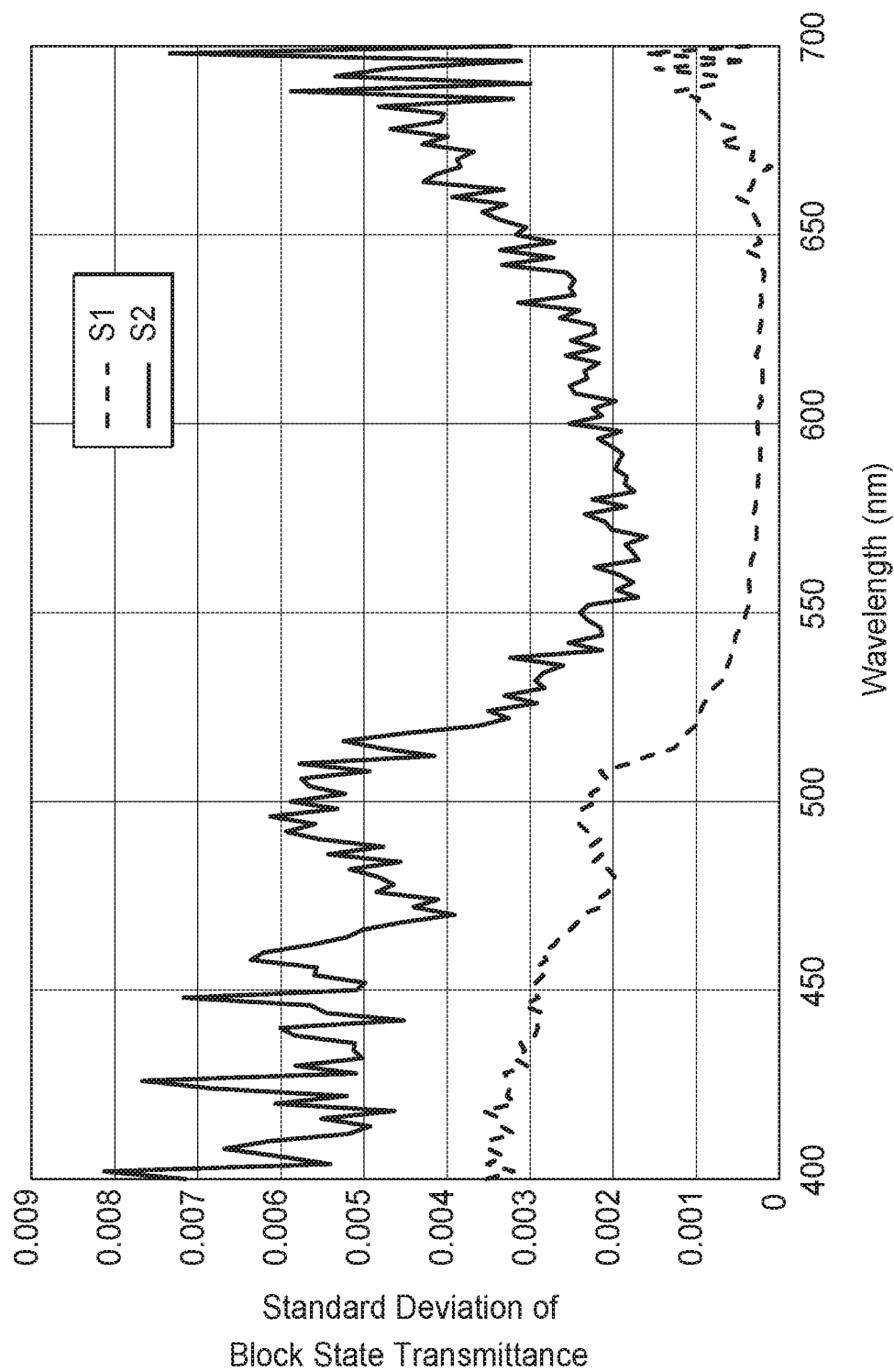
FIG. 10D is a plot of the standard deviation of optical transmittance for absorbing polarizers.

FIG. 10D is a plot of the standard deviation of optical transmittance for substantially normally incident light 120 having the second (block) polarization state versus wavelength for absorbing polarizers. The curves of FIG. 10D were obtained from the curves of FIG. 10B by determining the standard deviation of the transmittance at the 4 points. In some embodiments, the absorbing polarizer 200 has an optical transmittance for substantially normally incident light 120 having a standard deviation greater than about 0.001 or greater than about 0.0015 throughout a wavelength range extending at least from about 450 nm to about 650 nm for the second polarization state.

Figure 10E:
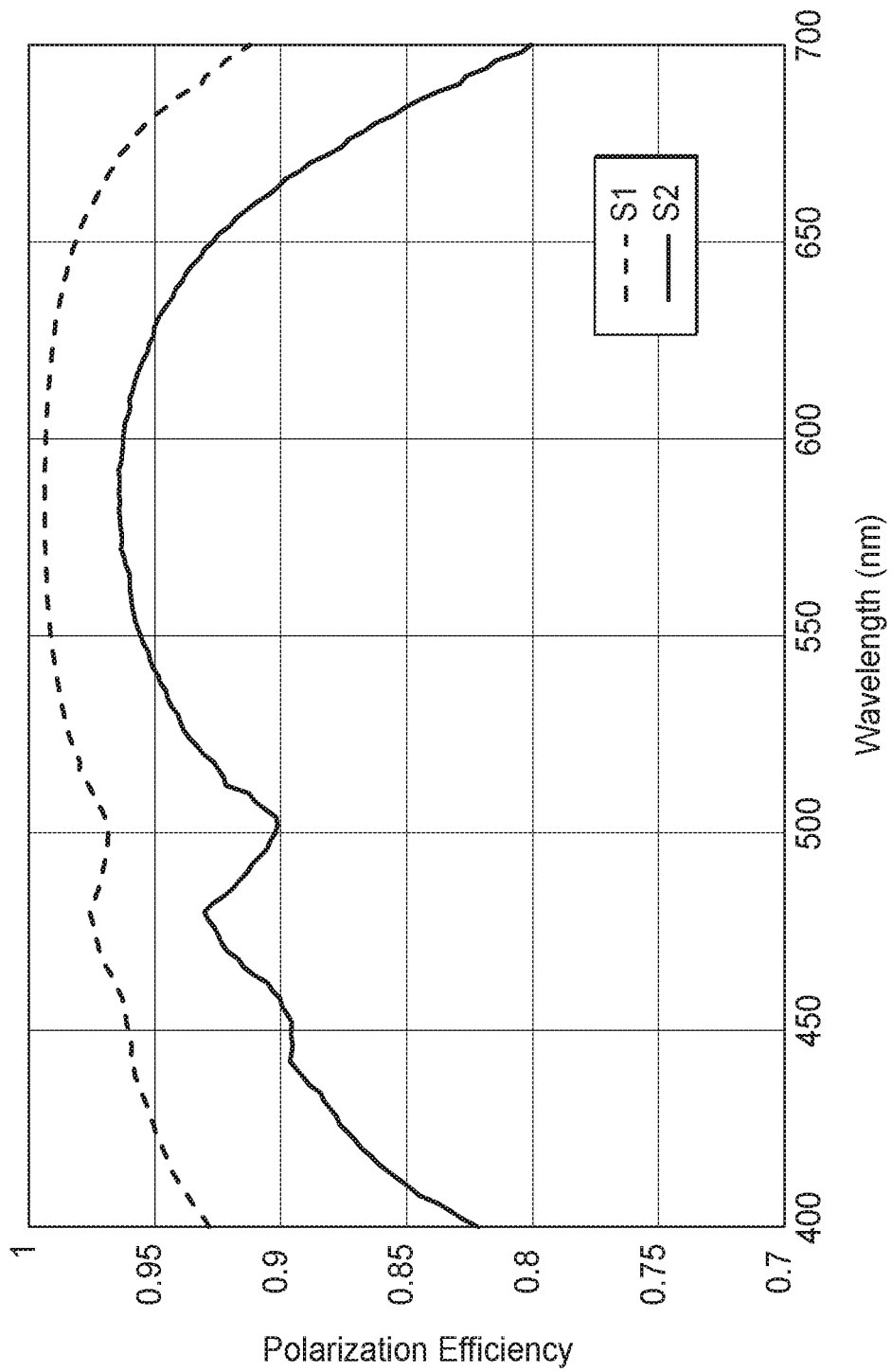
FIG. 10E is a plot of the average polarization efficiency versus wavelength for absorbing polarizers.
Figure 10F:
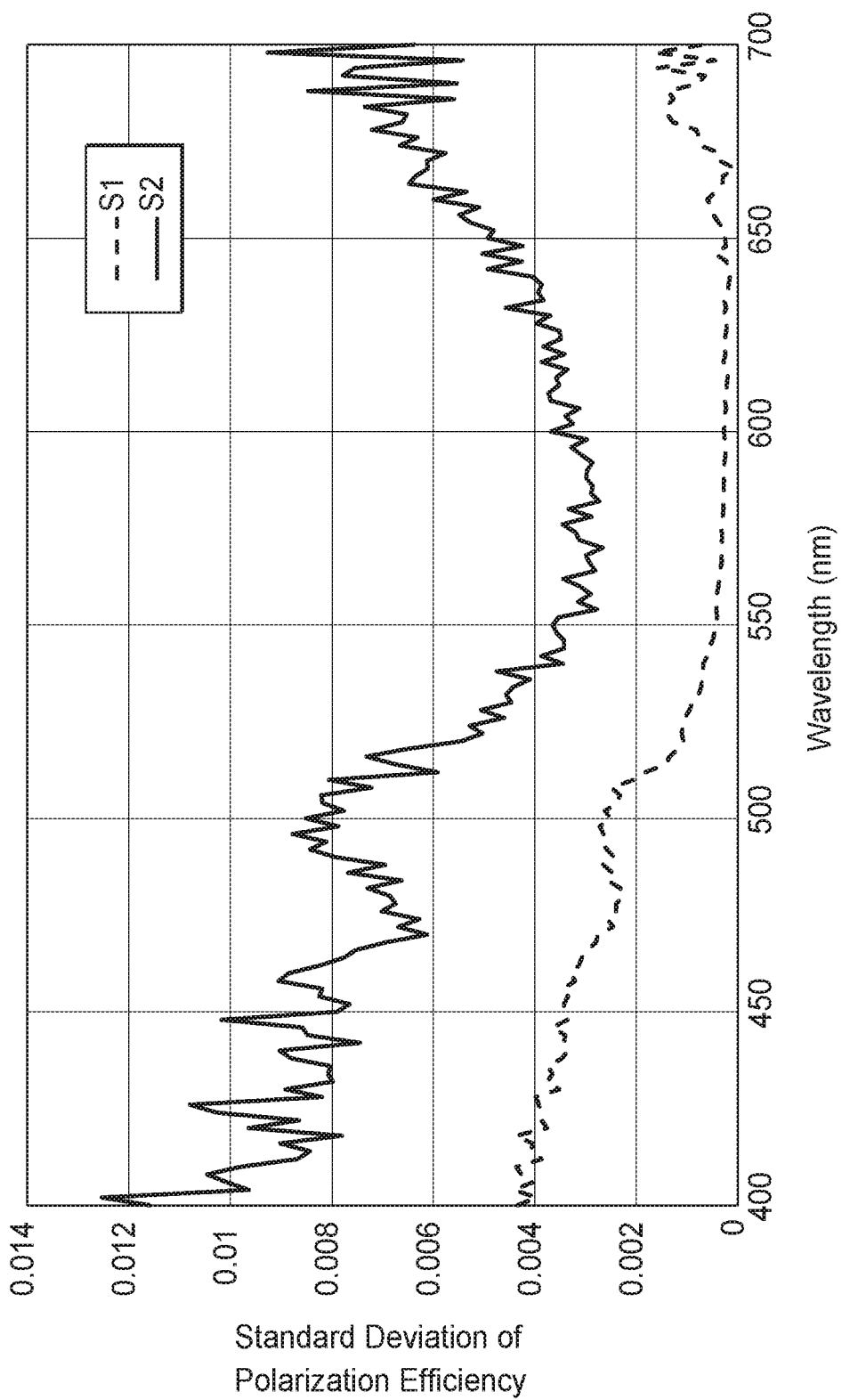
FIG. 10F is a plot of the standard deviation of the polarization efficiency versus wavelength for absorbing polarizers.

FIG. 10E is a plot of the average polarization efficiency for substantially normally incident light 120 versus wavelength for absorbing polarizers. FIG. 10F is a plot of the standard deviation of the polarization efficiency for substantially normally incident light 120 versus wavelength for the absorbing polarizers. In some embodiments, the absorbing polarizer 200 has a polarization efficiency for substantially normally incident light 120 having a standard deviation greater than about 0.0015 or greater than about 0.002 throughout a wavelength range extending at least from about 450 nm to about 650 nm for the second polarization state. The curves of FIGS. 10E-10F were determined from the curves of FIGS. 10A-10B by determining the averages and standard deviations of the polarization efficiency determined at the 4 points. For the second absorbing polarizer "S2", the average polarization efficiency is 0.902 at a wavelength of 500 nm and the standard deviation of the polarization efficiency is 0.00852.

In some embodiments, the absorbing polarizer 200 has the optical transmission, and other optical properties described elsewhere herein, for the second absorbing polarizer "S2". In some embodiments, the absorbing polarizer 200 is another absorbing polarizer having optical properties described elsewhere herein. In some embodiments, the absorbing polarizer 200 has the optical transmission, and other optical properties, of a third absorbing polarizer that is thinner than the second absorbing polarizer. A thinner absorbing polarizer would be expected to have a higher average transmittance than shown in FIG. 10C, for example; a higher standard deviation of block state transmittance than shown in FIG. 10D, for example; a lower polarization efficiency than shown in FIG. 10E, for example; and a higher standard deviation of polarization efficiency than shown in FIG. 10F, for example.

Figure 11A:
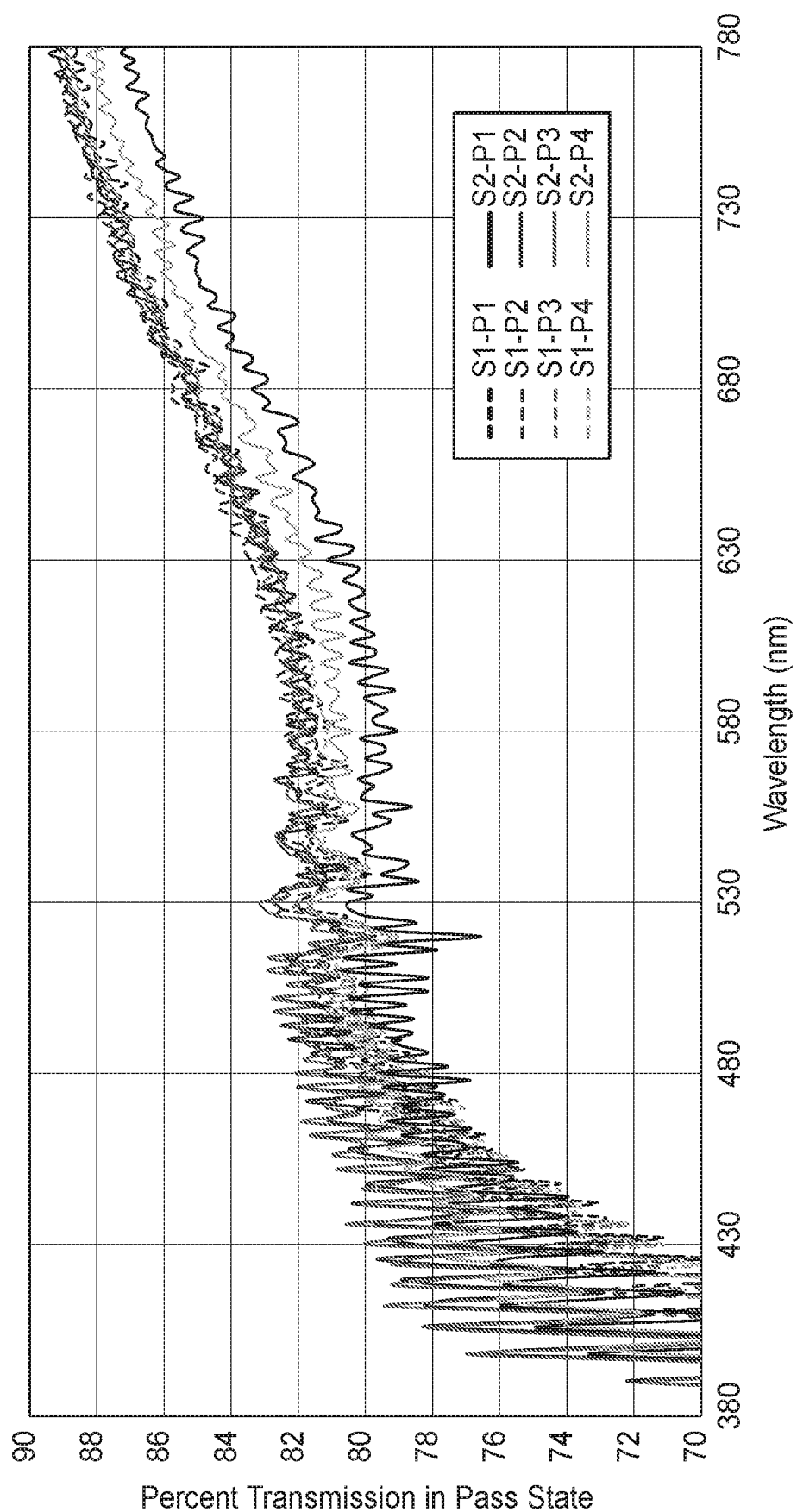
FIGS. 11A-11B are plots of optical transmission versus wavelength for optical stacks for first and second polarization states, respectively.
Figure 11B:
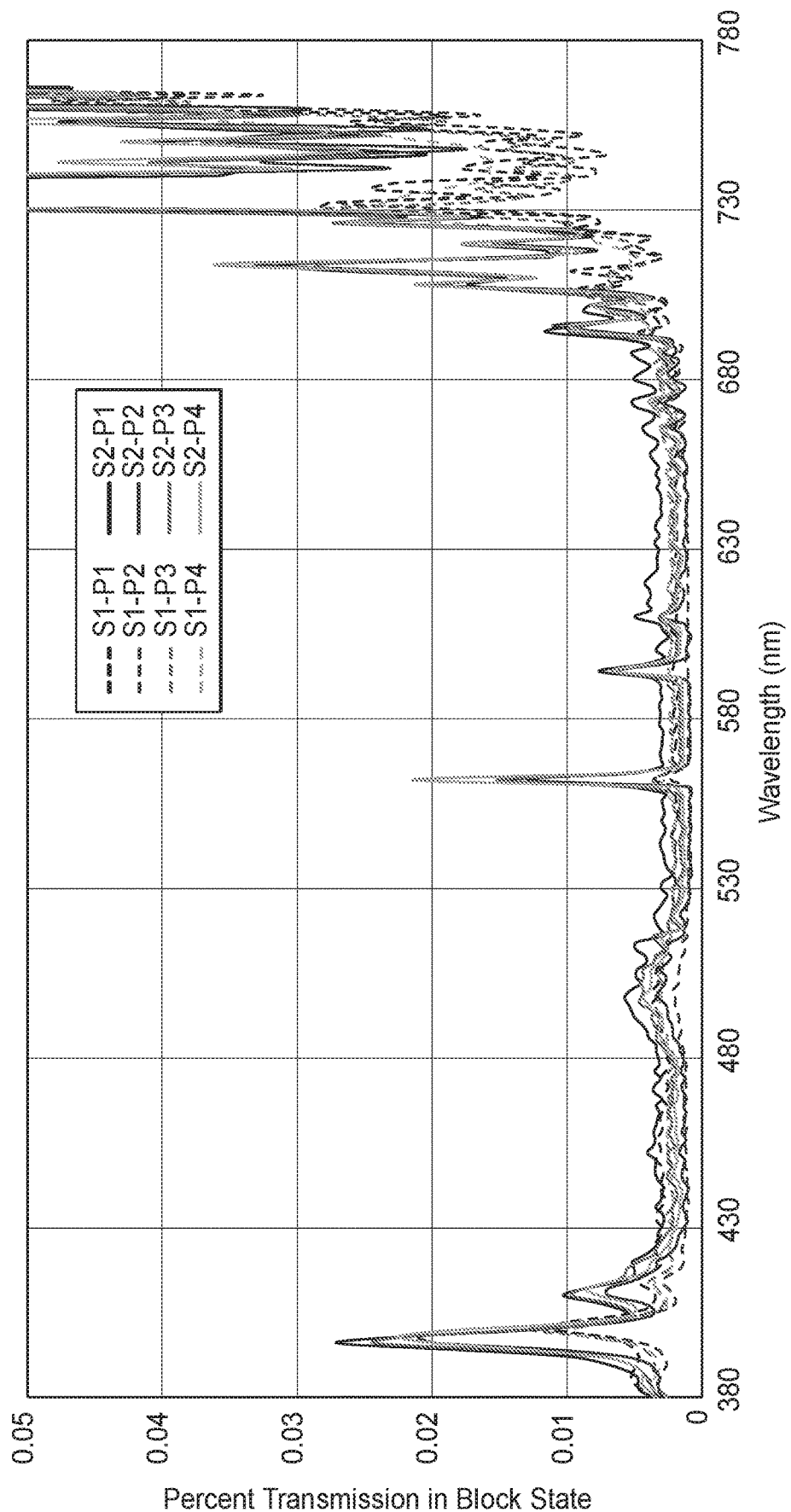
Figure 11C:
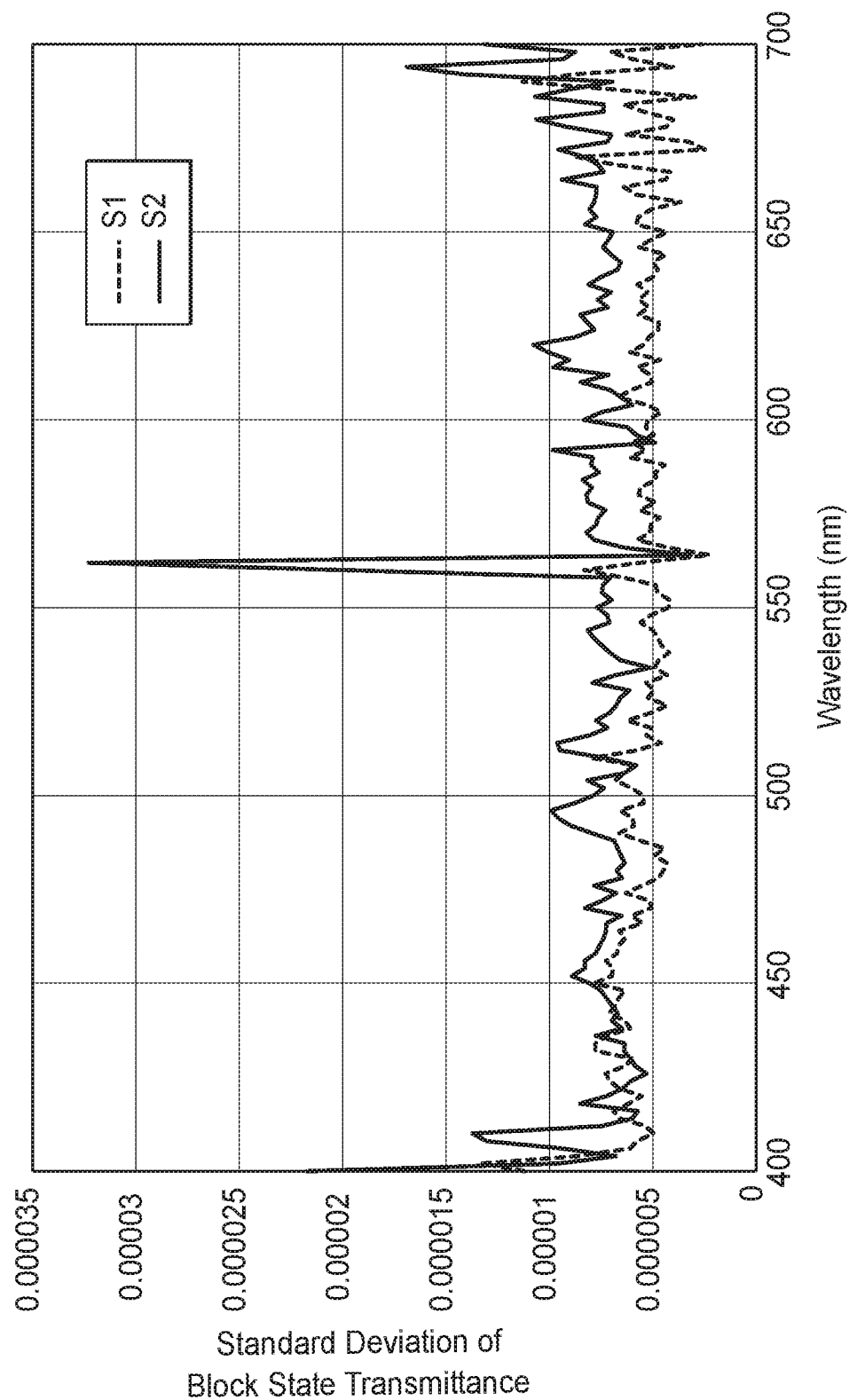
FIG. 11C is a plot of the standard deviation versus wavelength of the optical transmittance for the second polarization state for optical stacks.

FIGS. 11A-11B are a plots of optical transmission versus wavelength for optical stacks for substantially normally incident light 120 in a first polarization state (pass state) and in a second polarization state (block state), respectively. The plots are for an optical stack including a reflective polarizer and the first absorbing polarizer ("S1"), and for an optical stack including the reflective polarizer and the second absorbing polarizer ("S2") having a thickness of about 50% of that of the first absorbing polarizer. The reflective polarizer used for these plots is the reflective polarizer used for the plots of FIGS. 6A-6F. Curves measured at 4 spaced apart locations for each polarizer are shown. FIG. 11C is a plot of the standard deviation versus wavelength of the optical transmittance for substantially normally incident light having the second polarization state (block state) for the optical stacks.

For the reflective polarizer ("RP") of FIGS. 6A-6F, the first ("S1") and second ("S2") absorbing polarizers of FIGS. 10A-10F, and the optical stacks of FIGS. 11A-11B, the transmission in the block and pass states, the average transmittance (average of the block and pass transmissions divided by 100%), and the polarization efficiency were determined at 4 points on the samples and averaged over wavelengths from 450 nm to 650 nm for each of the 4 points. The average and standard deviation of the wavelength-averaged quantities determined at these points were determined and are reported in the following table with the standard deviation given in parenthesis next to the mean. For comparison, a commercially available SANRITZ polarizer was tested similarly and the results are included in the following table.

|  | Block Transmission (%) | Pass Transmission (%) | Average Transmittance | Polarization Efficiency |
|---|---|---|---|---|
| S1 | 1.38 (0.1) | 82.1 (0.46) | 0.417 (0.0027) | 0.983 (0.0011) |
| S2 | 5.19 (0.33) | 82.3 (1.61) | 0.437 (0.0064) | 0.939 (0.005) |
| RP | 0.013 (0.003) | 87.8 (0.59) | 0.439 (0.0029) | 0.99985 (0.000035) |
| S1 + RP | 0.0021 (0.0005) | 81.1 (0.37) | 0.405 (0.0018) | 0.999975 (0.000006) |
| S2 + RP | 0.0025 (0.0007) | 81.0 (0.98) | 0.405 (0.0049) | 0.999968 (0.000009) |
| SANRITZ | 0.0068 (0.0006) | 82.9 (0.27) | 0.414 (0.0014) | 0.999918 (0.000008) |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 5 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.95 and 1.05, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:
1. An optical stack comprising:
a reflective polarizer comprising a plurality of interference layers; and
an absorbing polarizer disposed on and substantially co-extensive with the reflective polarizer, such that for a substantially normally incident light and for at least a first wavelength between about 450 nm and about 670 nm:
each interference layer reflects or transmits light primarily by optical interference;
the plurality of interference layers transmits at least about 85% of the incident light having a first polarization state, reflects at least about 80% of the incident light having an orthogonal second polarization state, and transmits less than about 0.1% of the incident light having the second polarization state;
the absorbing polarizer has a first optical transmittance for the first polarization state, an optical absorption greater than about 50% for the second polarization state, and a second optical transmittance for the second polarization state, an average of the first and second optical transmittances greater than about 0.46, the second optical transmittance having a first standard deviation across at least 80% of the absorbing polarizer, the first standard deviation greater than about 0.004; and
the optical stack has an optical transmittance for the second polarization state having a second standard deviation across at least 80% of the optical stack, the second standard deviation less than about 0.001.

2. The optical stack of claim 1, wherein the first wavelength is about 550 nm.

3. The optical stack of claim 1, wherein each interference layer has an average thickness less than about 500 nm.

4. The optical stack of claim 1, wherein the absorbing polarizer is bonded to the reflective polarizer.

5. The optical stack of claim 1, wherein the absorbing polarizer is coated on the reflective polarizer.

6. The optical stack of claim 1, wherein the first standard deviation is greater than about 0.005.

7. The optical stack of claim 1, wherein the second standard deviation is less than about 0.0001.

8. The optical stack of claim 1, wherein for a substantially normally incident unpolarized light and for a first wavelength range of about 450 nm to about 650 nm:
the absorbing polarizer has an optical transmittance averaged over the first wavelength range having a third standard deviation across at least 80% of the absorbing polarizer; and
the optical stack has an optical transmittance averaged over the first wavelength range having a fourth standard deviation across at least 80% of the optical stack, the fourth standard deviation less than the third standard deviation by at least about 10%.

9. The optical stack of claim 8, wherein the third standard deviation is greater than about 0.005.

10. A display comprising:
 a display panel;
 an extended light source configured to provide illumination to the display panel; and
 the optical stack of claim 1 disposed between the display panel and the extended light source, the absorbing polarizer facing the display panel, the reflective polarizer facing the extended light source.

11. The optical stack of claim 1, wherein the first standard deviation divided by the second standard deviation is at least about 10.

12. The optical stack of claim 1, wherein the first standard deviation divided by the second standard deviation is at least about 100.

13. The optical stack of claim 1, wherein the first standard deviation divided by the second standard deviation is at least about 400.

* * * * *